US012802991B2

(12) United States Patent
Matsuoka et al.

(10) Patent No.: US 12,802,991 B2
(45) Date of Patent: Nov. 17, 2026

(54) LIQUID COMPOSITION FOR ELECTRODE, STORAGE CONTAINER, ELECTRODE MANUFACTURING DEVICE, METHOD OF MANUFACTURING ELECTRODE, ELECTRODE, AND ELECTROCHEMICAL DEVICE

(71) Applicants: Kohji Matsuoka, Kanagawa (JP); Hiromitsu Kawase, Kanagawa (JP); Yuu Zama, Kanagawa (JP); Ryuji Higashi, Kanagawa (JP); Okitoshi Kimura, Kanagawa (JP); Tomoya Ohmura, Kanagawa (JP); Takuya Saiga, Kanagawa (JP); Naoki Shiraishi, Kanagawa (JP); Toshiya Sagisaka, Kanagawa (JP); Daisuke Nose, Kanagawa (JP)

(72) Inventors: Kohji Matsuoka, Kanagawa (JP); Hiromitsu Kawase, Kanagawa (JP); Yuu Zama, Kanagawa (JP); Ryuji Higashi, Kanagawa (JP); Okitoshi Kimura, Kanagawa (JP); Tomoya Ohmura, Kanagawa (JP); Takuya Saiga, Kanagawa (JP); Naoki Shiraishi, Kanagawa (JP); Toshiya Sagisaka, Kanagawa (JP); Daisuke Nose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 768 days.

(21) Appl. No.: 18/253,962

(22) PCT Filed: Nov. 24, 2021

(86) PCT No.: PCT/JP2021/042897

§ 371 (c)(1),
(2) Date: May 23, 2023

(87) PCT Pub. No.: WO2022/113969

PCT Pub. Date: Jun. 2, 2022

(65) Prior Publication Data

US 2024/0021825 A1 Jan. 18, 2024

(30) Foreign Application Priority Data

Nov. 30, 2020 (JP) ................................ 2020-199083
Sep. 29, 2021 (JP) ................................ 2021-159215

(51) Int. Cl.
*H01M 4/62* (2006.01)
*H01M 4/04* (2006.01)
*H01M 4/48* (2010.01)

(52) U.S. Cl.
CPC ......... *H01M 4/622* (2013.01); *H01M 4/0414* (2013.01); *H01M 4/48* (2013.01)

(58) Field of Classification Search
CPC ....... H01M 4/622; H01M 4/0414; H01M 4/48
See application file for complete search history.

(56) References Cited

U.S. PATENT DOCUMENTS 4,837,096 A 6/1989 Kimura et al.
4,886,572 A 12/1989 Kimura et al.
(Continued)

FOREIGN PATENT DOCUMENTS

CN 109818057 A 5/2019
JP 11-003709 A 1/1999
(Continued)

OTHER PUBLICATIONS

International Search Report for PCT/JP2021/042897 mailed on Mar. 18, 2022.
(Continued)

*Primary Examiner* — Wyatt P McConnell
(74) *Attorney, Agent, or Firm* — Grüneberg Global IP, PLLC

(57) ABSTRACT

A liquid composition for electrodes is capable of forming an isolation layer having an excellent adhesion to the electrode composite material layer when used as an electrode for an electrochemical device. A corresponding electrochemical
(Continued)

device has excellent electrochemical device characteristics. The liquid composition for an electrode contains inorganic particles, a resin, and a dispersant. The resin is soluble in a non-polar solvent or in a mixed solvent containing a non-polar solvent, and the resin has an ethylene oxide chain in a main chain.

20 Claims, 5 Drawing Sheets

(56) References Cited

U.S. PATENT DOCUMENTS

| | | | | |
|---|---|---|---|---|
| 4,948,685 | A | 8/1990 | Ohsawa et al. | |
| 4,999,263 | A | 3/1991 | Kabata et al. | |
| 5,011,751 | A | 4/1991 | Yoneyama et al. | |
| 5,037,713 | A | 8/1991 | Yoshino et al. | |
| 5,077,152 | A | 12/1991 | Yoshino et al. | |
| 5,100,437 | A | 3/1992 | Yoshino et al. | |
| 5,162,178 | A | 11/1992 | Ohsawa et al. | |
| 5,223,353 | A | 6/1993 | Ohsawa et al. | |
| 5,437,943 | A | 8/1995 | Fujli et al. | |
| 5,489,492 | A | 2/1996 | Asami et al. | |
| 5,885,733 | A | 3/1999 | Ohsawa et al. | |
| 5,900,336 | A | 5/1999 | Kabata et al. | |
| 6,013,393 | A | 1/2000 | Taniuchi et al. | |
| 10,601,011 | B2 * | 3/2020 | Yasuda | H01M 50/443 |
| 2005/0250001 | A1 | 11/2005 | Kimura et al. | |
| 2007/0281200 | A1 | 12/2007 | Tanaka et al. | |
| 2008/0118826 | A1 | 5/2008 | Shimamura et al. | |
| 2008/0299461 | A1 | 12/2008 | Kim | |
| 2014/0093767 | A1 | 4/2014 | Sakitani et al. | |
| 2015/0287537 | A1 | 10/2015 | Onagi et al. | |
| 2015/0303512 | A1 | 10/2015 | Kimura et al. | |
| 2015/0303513 | A1 | 10/2015 | Hirowatari et al. | |
| 2016/0260972 | A1 | 9/2016 | Hibino et al. | |
| 2017/0358818 | A1 | 12/2017 | Nakamura et al. | |
| 2018/0261827 | A1 | 9/2018 | Yanagita et al. | |
| 2019/0288259 | A1 | 9/2019 | Ohkimoto et al. | |
| 2019/0288276 | A1 | 9/2019 | Utsuki et al. | |
| 2020/0119333 | A1 | 4/2020 | Masuzawa et al. | |
| 2020/0321616 | A1 | 10/2020 | Takauji et al. | |
| 2021/0159023 | A1 | 5/2021 | Matsuoka et al. | |
| 2021/0159480 | A1 | 5/2021 | Nakajima et al. | |
| 2021/0159494 | A1 | 5/2021 | Higashi et al. | |
| 2021/0234171 | A1 | 7/2021 | Sagisaka et al. | |
| 2021/0261796 | A1 | 8/2021 | Kawase et al. | |
| 2022/0013865 | A1 | 1/2022 | Matsuoka et al. | |
| 2022/0407074 | A1 | 12/2022 | Masuzawa et al. | |

FOREIGN PATENT DOCUMENTS

| | | | |
|---|---|---|---|
| JP | 2000-277386 | | 10/2000 |
| JP | 2006-173001 | A | 9/2006 |
| JP | 2010-218986 | A | 9/2010 |
| JP | 4734912 | | 7/2011 |
| JP | 2016-162528 | A | 9/2016 |
| JP | 2019-164982 | A | 9/2019 |
| JP | 2021-080404 | | 5/2021 |
| JP | 2021-082511 | | 5/2021 |
| JP | 2021-086669 | | 6/2021 |
| JP | 2021-136232 | | 9/2021 |
| KR | 10-2008-0105853 | A | 12/2008 |
| KR | 10-2020-0057128 | A | 5/2020 |
| WO | 2013/001919 | | 1/2013 |
| WO | 2020/158545 | | 8/2020 |

OTHER PUBLICATIONS

U.S. Appl. No. 07/269,951, filed Nov. 10, 1988.
U.S. Appl. No. 07/483,267, filed Feb. 16, 1990.
U.S. Appl. No. 07/879,172, filed May 6, 1992.
U.S. Appl. No. 08/363,874, filed Dec. 27, 1994.
U.S. Appl. No. 08/653,318, filed May 24, 1996.
U.S. Appl. No. 08/498,801, filed Jul. 6, 1995.
U.S. Appl. No. 08/713,252, filed Sep. 12, 1996.
U.S. Appl. No. 08/591,351, filed Jan. 25, 1996.
Office Action issued in European Patent Application No. 21 824 096.8 on Sep. 22, 2025, 5 pages.
Office Action received for Korean Patent Application No. 10-2023-7020813, mailed on May 22, 2025, 19 pages with English translation.
Office Action issued in Japanese Patent Application No. 2021-159215, mailed on Nov. 25, 2025, with English translation, 18 pages.
Office Action received for Japanese patent application No. 2021-159215 dated Apr. 7, 2026, 8 pages with English translation.

* cited by examiner

[Fig. 1]
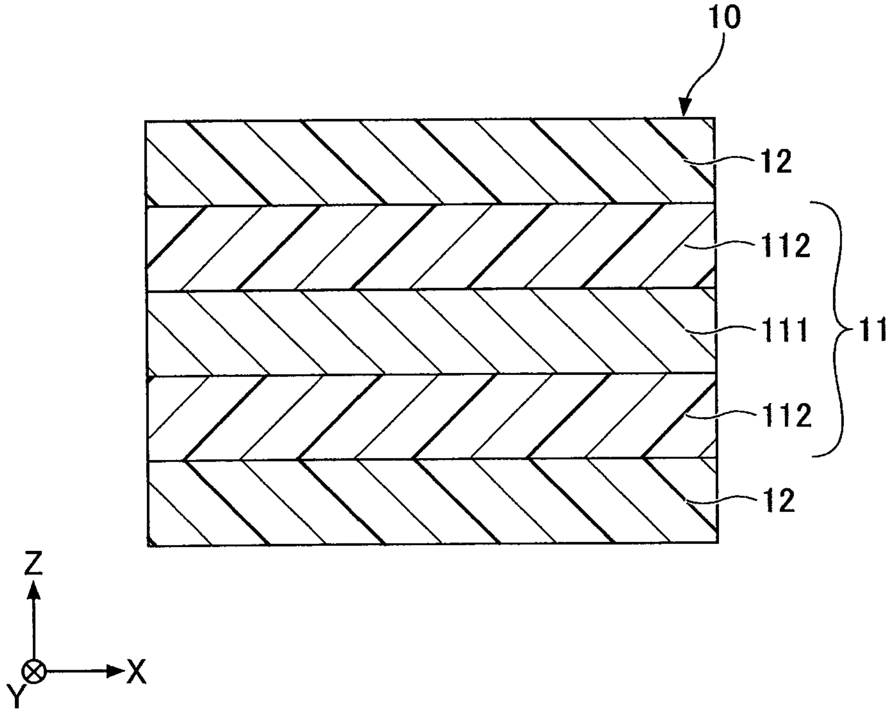

[Fig. 2]
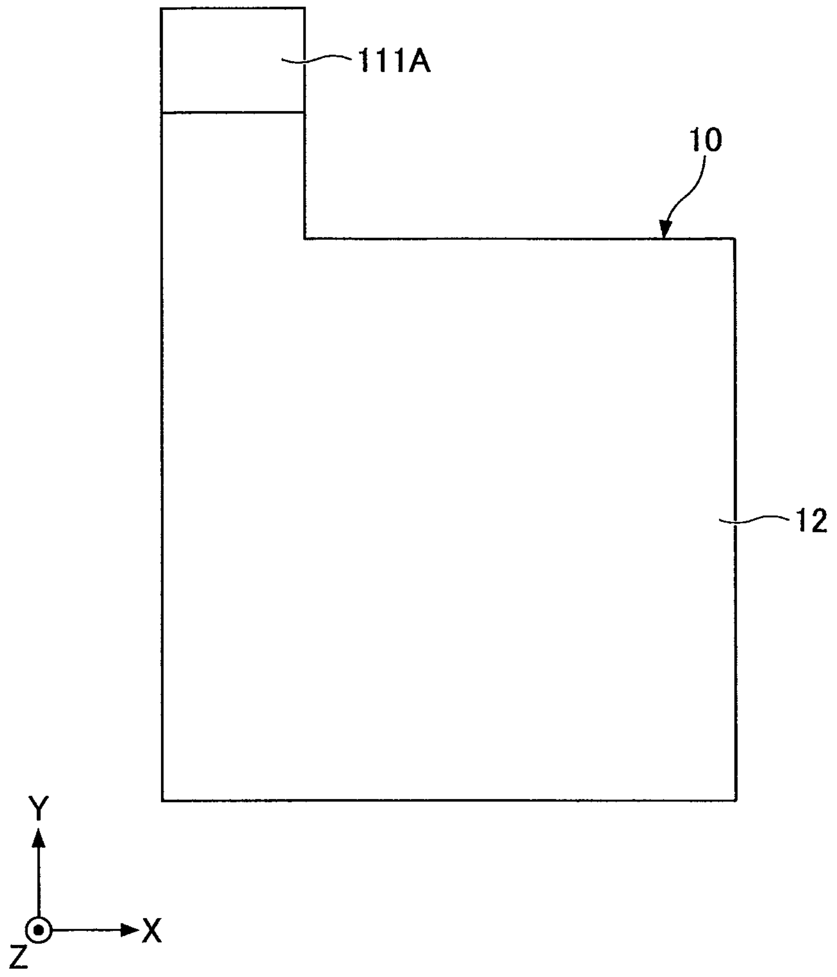

[Fig. 3]
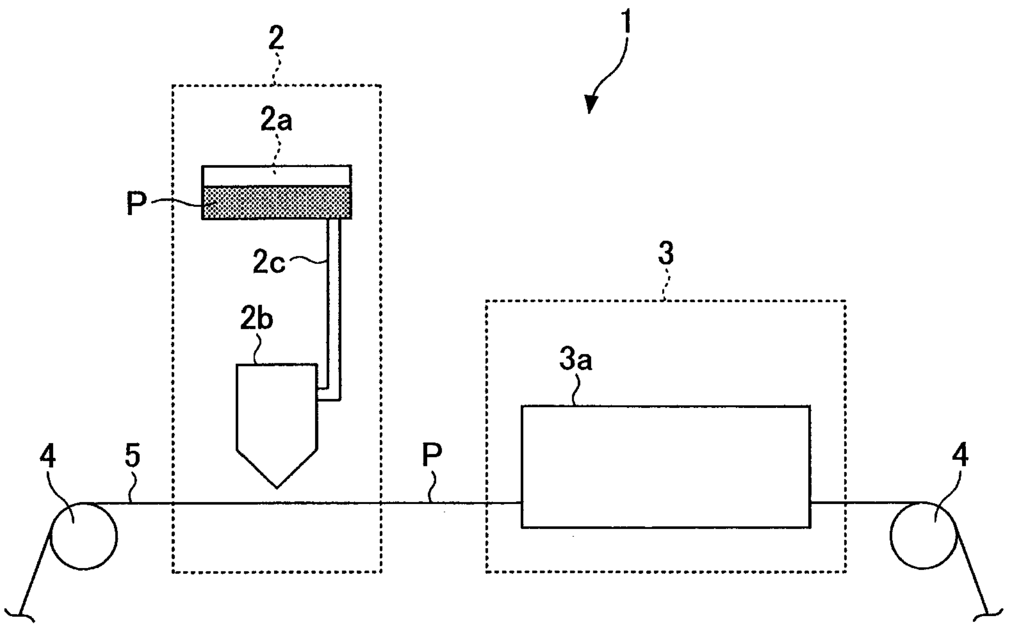

[Fig. 4]
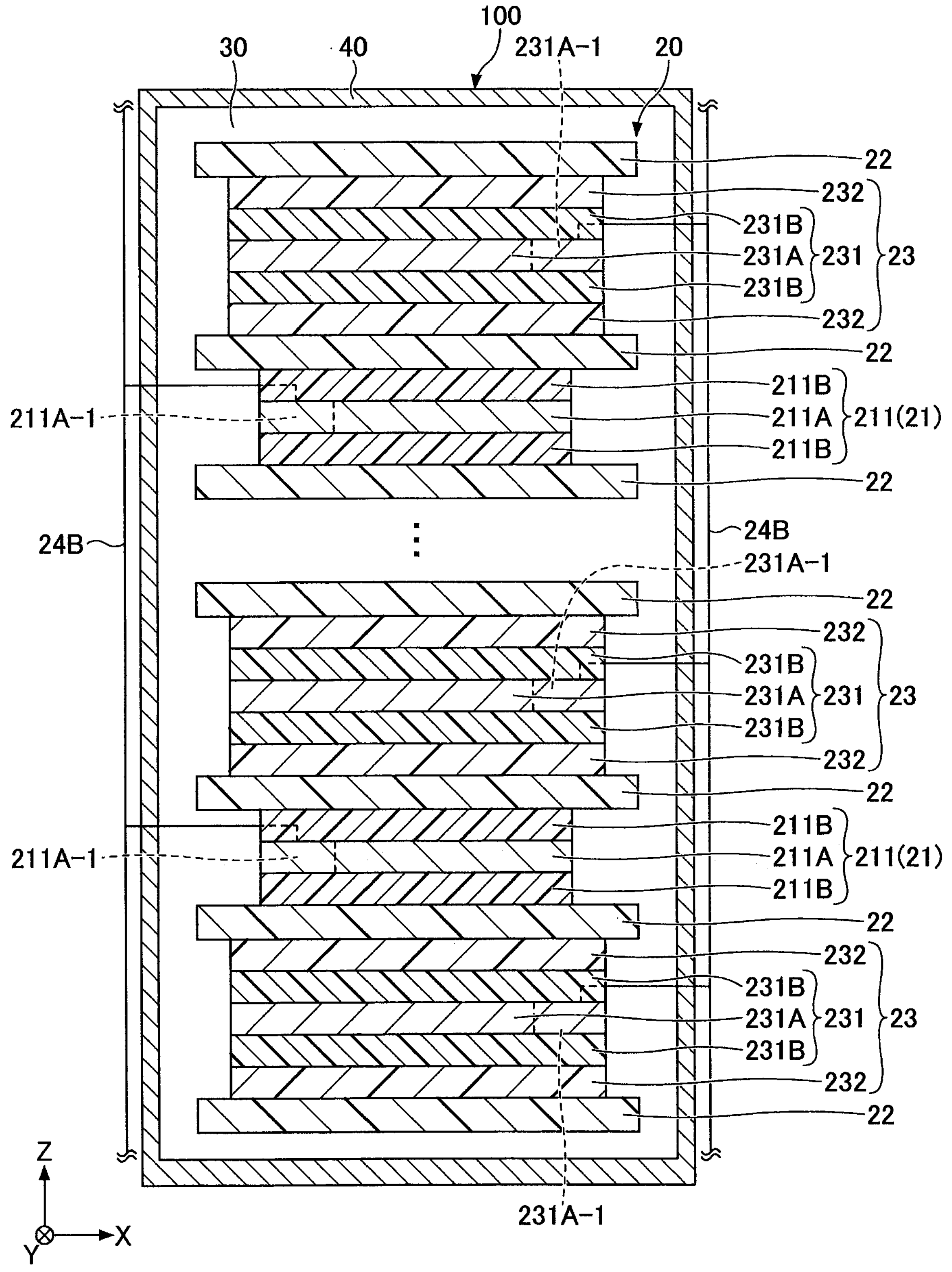

[Fig. 5]
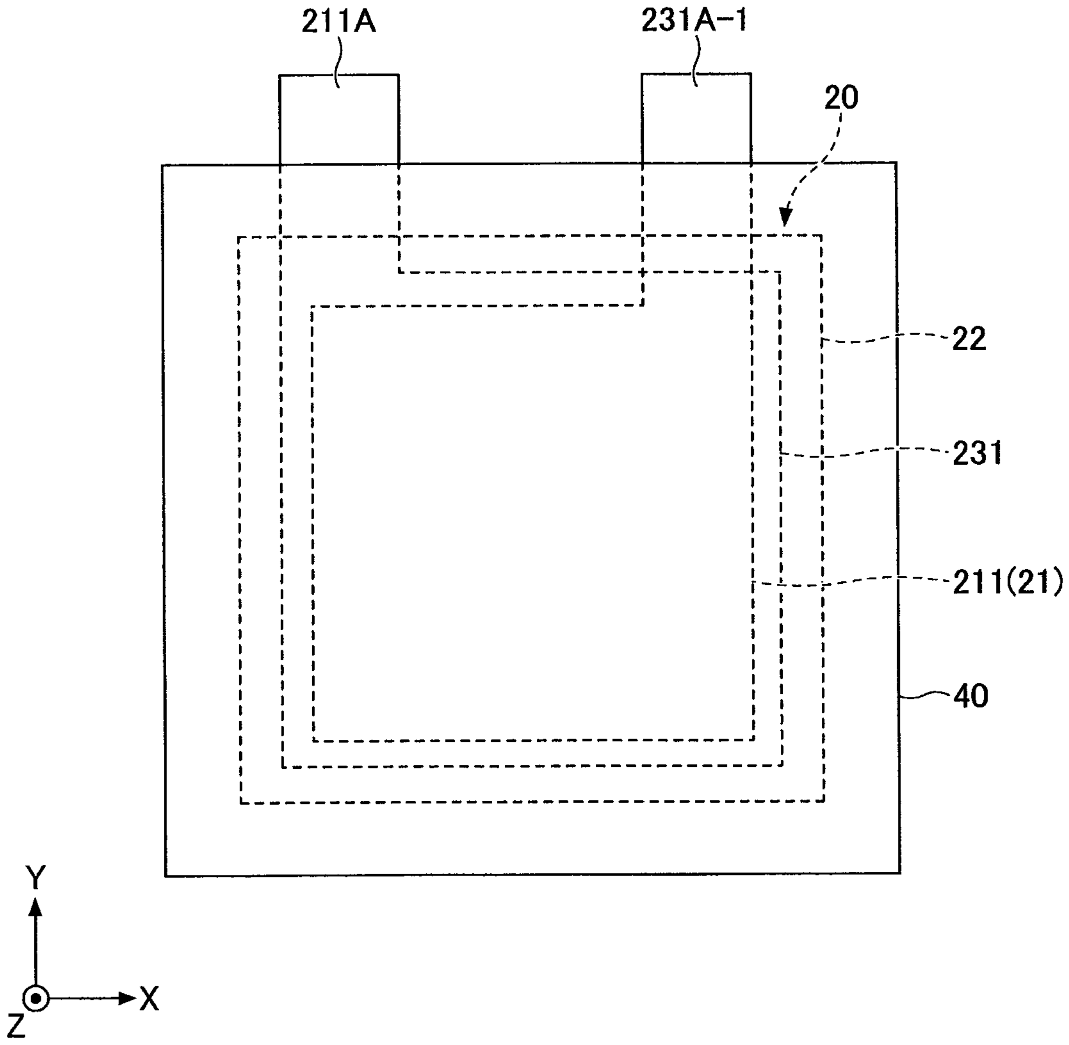

LIQUID COMPOSITION FOR ELECTRODE, STORAGE CONTAINER, ELECTRODE MANUFACTURING DEVICE, METHOD OF MANUFACTURING ELECTRODE, ELECTRODE, AND ELECTROCHEMICAL DEVICE

CROSS-REFERENCE TO RELATED APPLICATIONS

This application is the National Stage entry under § 371 of International Application No. PCT/JP2021/042897, filed on Nov. 24, 2021, and which claims the benefit of priority to Japanese Application No. 2020-199083, filed on Nov. 30, 2020; and to Japanese Application No. 2021-159215, filed on Sep. 29, 2021. The content of each of these applications is hereby incorporated by reference in its entirety.

TECHNICAL FIELD

The present invention relates to a liquid composition for electrode, a storage container, electrode manufacturing device, a method of manufacturing electrodes, electrodes, and an electrochemical device.

BACKGROUND ART

Electrochemical devices are used as power sources for portable devices, hybrid vehicles, electric vehicles, wearable devices, and the like. In particular, non-aqueous electrolyte secondary batteries (lithium-ion secondary batteries) with high energy density are widely used as electrochemical devices.

An electrochemical device has a positive electrode, a negative electrode, a separator, and a non-aqueous electrolyte, and a plurality of laminates are arranged in the non-aqueous electrolyte in which the positive electrode and the negative electrode are alternately laminated while the separators are sandwiched. As a method of manufacturing electrodes, separators, and the like that constitute an electrochemical device, for example, a method of integrally forming electrodes and separators together using a liquid composition for electrode containing particles is known.

As a method of forming electrodes and a separator integrally, for example, Patent Document 1 discloses a method of manufacturing an electric double layer capacitor separator having porous bonding with an electrode integrally bonded thereto by applying and solidifying a mixture containing ceramic powder particles and an electrolyte-resistant binder on at least one of the surfaces of the positive and negative electrodes.

SUMMARY OF INVENTION

Problem to be Solved by the Invention

However, the electric double layer capacitor separator manufactured according to the method of Patent Document 1 is porous. Therefore, there is a problem that even when the electrodes are bonded integrally, the non-aqueous electrolyte penetrates the gap between the separator and the electrodes, and thus the adhesion between the separator and the electrodes cannot be maintained. When the separator and the electrodes are peeled off, the characteristics of the electric double layer capacitor separator could not be maintained, and there was a concern that the characteristics of the electric double layer capacitor separator would be reduced.

An aspect of the present invention is to provide a liquid composition for electrode capable of forming an isolation layer having an excellent adhesion to the electrode composite material layer when used as an electrode for an electrochemical device, and realizing an electrochemical device having excellent electrochemical device characteristics.

Means for Solving Problems

An aspect of the liquid composition for electrode of the present invention includes inorganic particles, resins, and a dispersion medium, wherein the resin is soluble in a non-polar solvent or in a mixed solvent containing a non-polar solvent. The resin has an ethylene oxide chain in the main chain.

Effects of the Invention

An aspect of the present invention can provide a liquid composition for electrode capable of forming an isolation layer having excellent adhesion to the electrode composite material layer when used as electrodes in an electrochemical device, and realizing an electrochemical device having excellent electrochemical device characteristics.

BRIEF DESCRIPTION OF DRAWINGS

FIG. 1 is a cross-sectional view illustrating a configuration of an electrode according to an embodiment of the present invention.

FIG. 2 is a planar view illustrating a configuration of the electrode according to an embodiment of the present invention.

FIG. 3 is a schematic view illustrating an example of a configuration of an electrode manufacturing device according to an embodiment of the present invention.

FIG. 4 is a cross-sectional view illustrating a configuration of an electrochemical device according to an embodiment of the present invention.

FIG. 5 is an explanatory view illustrating an arrangement of a positive electrode, a separator, and a negative electrode in a planar view of an electrode device.

MODE FOR CARRYING OUT THE INVENTION

Hereinafter, embodiments of the present invention will be described in detail. It should be noted that the embodiments are not limited by the following description and may be appropriately modified without departing from the spirit of the present invention. As used herein, "to" means to include the values described before and after the "to" in the numerical range as the lower and upper limits, unless otherwise indicated.

<Liquid Composition for Electrode>

A liquid composition for electrode according to embodiments of the present invention is a liquid composition for use in electrodes provided with an electrochemical device, including inorganic particles, resins, and a dispersion medium. As used herein and below, the term "for electrodes" means to be used in the manufacture of electrodes, wherein the electrodes manufactured therein include at least an isolation layer formed by a liquid composition according to this embodiment.

Inorganic Particles

Examples of the material constituting the inorganic particles include aluminum oxide (alumina), silicon dioxide (silica), magnesium oxide, titanium oxide, zirconium oxide, magnesium hydroxide, calcium carbonate, calcium phosphate, hydroxyapatite, and the like. These may be used alone or in combination with two or more materials. Among these, aluminum oxide and silicon dioxide are preferably used for use in manufacturing electrodes of lithium ion secondary batteries because of their high insulation and heat resistance. Furthermore, aluminum oxide is further preferably used because aluminum oxide functions as a scavenger for "junk" species, that is, species that cause capacitive fades in lithium ion secondary batteries. In addition, aluminum oxide has an excellent wettability to the electrolyte, resulting in a high absorption rate of the electrolyte. Therefore, when a liquid composition for electrode of the present embodiment is used in the manufacture of electrodes of an electrochemical device, the performance of the electrochemical device, such as the cycle characteristics of a lithium ion secondary battery, can be improved. Specifically, the aluminum oxide may be AA-05 (manufactured by Sumitomo Chemical Co., Ltd.), AES-11C (manufactured by Sumitomo Chemical Co., Ltd.), AES-11F (manufactured by Sumitomo Chemical Co., Ltd.), AKP-3000 (manufactured by Sumitomo Chemical Co., Ltd.), CT-3000 LSSG (manufactured by Almatis Co., Ltd.), LS-502 (manufactured by Japan Light Metals Co., Ltd.), LS-711CB (manufactured by Japan Light Metals Co., Ltd.), SLS710 (manufactured by Japan Light Metals Co., Ltd.), SEPal-60 (manufactured by Alteo Co., Ltd.), SEPal-70 (manufactured by Arteo Co., Ltd.), and the like.

The type of alumina is not particularly limited and includes, for example, α-alumina, γ-alumina, s-alumina, fumed alumina, and the like. Among these, α-alumina is preferable from the viewpoint of insulation property and abrasion resistance.

This alumina may be used by mixing one or more of them. When two or more kinds of alumina are used, the main component of the alumina is preferably α-alumina from the viewpoint of insulation property and abrasion resistance. Here, when the main component is α-alumina, it refers to the content of α-alumina in the total alumina being 50% by mass or more. The content is more preferably 60% by mass or more, and the content is furthermore preferably 70% by mass or more. Within the above, a formation of a particle layer having excellent insulation property and abrasion resistance can be achieved.

The alumina contained in the liquid composition for electrode of the present embodiment may correspond to solid content in the liquid composition. The percentage of the solid content in the liquid composition is preferably 20 to 50% by mass and more preferably from 35 to 45% by mass.

The content of such alumina is of higher solid content than that of liquid compositions such as conventional inks. By setting the content of the alumina in the above range, unevenness in the coating thickness after drying can be prevented.

Resin

The resin functions to bond the particles together. The resin can be dissolved in a non-polar solvent or a mixture containing a non-polar solvent (mixed solvent) and has an ethylene oxide chain in the main chain. In water dispersion, resins having an ethylene oxide chain in the main chain have been found to easily adsorb from the zeta potential to particles. Even in a non-polar solvent or a mixture containing a non-polar solvent, it is assumed that resins having an ethylene oxide chain in the main chain easily adsorb to particles.

The solubility of resin in a non-polar solvent or in a mixture containing a non-polar solvent can be confirmed under condition such that the non-polar solvent or the mixture containing the non-polar solvent is in a liquid state. For example, the solubility in a mixture containing a polar solvent such as ethylene carbonate in addition to dimethyl carbonate, ethylmethyl carbonate, and a non-polar solvent may be verified at 25° C. and 1 atmosphere.

As used herein and below, a non-polar solvent is a solvent with a bonded dipole moment of 1.15D or less.

Dissolution refers to a state (solution) in which the desired molecules are uniformly mixed in the dispersion medium. The fact that the resin was dissolved in the dispersion medium was judged to be dissolved by examining the presence or absence of scattering by irradiating the solvent with laser light as a method for dissolving the resin and determining dissolution. The solvent was placed in a cylindrical glass container and the resin was dissolved. Laser light was evaluated by irradiating a GR108R red laser (beam diameter: 15×15 mm, wavelength: 640 to 660 nm) manufactured by TATA Corporation. In the evaluation method, the above laser light was irradiated into the portion of the cylindrical glass container containing the solvent, and the laser light was observed from the 90° side. If the laser light trajectory was not observed, there was no object scattered in the solvent, and it was assumed that the resin was dissolved in the solvent. In contrast, if the laser beam trajectory was observed, there were scattered objects in the solvent, and it was assumed that the resin was not dissolved in the solvent.

As a resin having a function to bond particles together, for example, polyvinylidene fluoride (PVDF) is commonly used. However, when a liquid composition for electrode containing PVDF is prepared, an aprotic polar solvent (for example, DMF, DMSO, or the like) is needed to be used as a dispersion medium due to the solubility of the PVDF.

However, when the aprotic polar solvent is used as the dispersion medium of the liquid composition for electrode and the isolation layer is formed by the manufacturing method including the step of applying the liquid composition for electrode for forming the electrodes on the electrode composite material layer formed on an electrode substrate (current collector) as described later, there is a concern that the adverse effect of the aprotic polar solvent on the electrode composite material layer containing the active material may occur, for example, a charge density of the electrode composite material layer may occur due to the swelling of the resin.

Similarly, there is concern that if a protonic polar solvent is used as a dispersion medium to form an isolation layer, it will react with lithium if a protonic polar solvent remains.

The liquid composition for electrode in accordance with the present embodiment uses a resin that can be dissolved in a non-polar solvent or a mixture containing a non-polar solvent as the dispersion medium. Therefore, it is possible to form an isolation layer that has excellent adhesion with the electrode composite material layer while eliminating the above-mentioned concern.

In addition, when the liquid composition for electrode of the present embodiment is used as an electrochemical device, the formed isolation layer can be partially dissolved in a non-polar solvent or a mixture containing a non-polar solvent, which is an electrolytic solution. Therefore, an electrochemical device with excellent ionic conductivity can be realized.

Examples of the resin include polymeric compounds containing a polymeric polycarboxylic acid and its salt, a polyoxyethylene group, a polyoxypropylene group, and the like, and dissolved in a non-polar solvent or in a mixture containing a non-polar solvent, and the like.

As the non-polar solvent, a dimethyl carbonate or an ethyl methyl carbonate is preferably used, from the point of use in the electrolytic solution.

The mixture containing a non-polar solvent may further contain a polar solvent. At this time, the polar solvent is preferably 50 wt % or less relative to the mixture, because the polar solvent can also be used as the electrolytic solution. Even when used as an electrolytic solution, the mixture having such a range can suppress the adverse effect on the electrode composite material layer containing the active material.

As the polar solvent, ethylene carbonate is preferably used because ethylene carbonate is excellent in dissolving the electrolyte.

As a mixture containing a non-polar solvent, an electrolyte salt is preferably included from the point of use in the electrolytic solution, and more preferably, the electrolyte salt is a lithium salt.

The resin preferably includes a block copolymer having an ethylene oxide chain in the main chain in terms of inhibiting the increase in viscosity of the liquid composition for electrode. The liquid composition for the electrodes in accordance with the present embodiment can suppress the increase in viscosity by the resin including a block copolymer having an ethylene oxide chain in the main chain. Therefore, the liquid composition for the electrodes can be uniformly applied to the surface of the electrode composite material layer constituting the electrodes when the liquid composition is used as the electrodes of the electrochemical device. Therefore, as the inorganic particles can be disposed over the entire surface of the electrodes and the irregularities on the surface of the electrodes can be reduced, the adhesion to the electrode composite material layer can be increased. Therefore, when the liquid composition for the electrodes of the present embodiment is used as the electrodes of the electrochemical device, the adhesion to the electrode composite material layer can be reliably enhanced.

The resin preferably includes a unit structure having a hydrophobic group and a unit structure having a hydrophilic group. The total number of hydrophilic groups contained in the resin is preferably greater than the total number of hydrophobic groups. The resin preferably contains a hydrophobic chain as the unit structure in addition to the ethylene oxide chain as the hydrophilic chain, and the resin more preferably has a propylene oxide chain as the hydrophobic chain. The hydrophobic chain of the resin contributes to the dispersion stability of the liquid composition for electrode. In addition, the characteristics of the electrochemical device can be improved by having a propylene oxide chain in which the resin has high ionic conductivity among the hydrophobic chains.

The resin having hydrophilic and hydrophobic chains preferably has more hydrophilic groups than hydrophobic groups in terms of adsorption to the particles.

The resin having the hydrophilic and hydrophobic chains preferably contains polyoxyethylene polyoxypropylene glycol as indicated in Structural Formula A below in terms of inhibiting the increase in viscosity of the liquid composition for electrode:

$$HO—(C_2H_4O)x\text{-}(C_3H_6O)y\text{-}(C_2H_4O)z\text{-}H$$

(wherein, x, y, and z are positive integers, x+z is preferably an integer satisfying a range of 3 to 200, and y is preferably an integer of 15 to 100.)

The liquid composition for electrode in accordance with the present embodiment can contain polyoxyethylene polyoxypropylene glycol indicated in the structural formula A above in the resin to suppress the increase in viscosity. Therefore, when the liquid composition for electrode of the present embodiment is used as electrodes of an electrochemical device, inorganic particles can be disposed over the entire surface of the electrode and irregularities on the surface of the electrodes can be reduced, thereby increasing the adhesion to the electrode composite material layer. Thus, the liquid composition for electrode in accordance with the present embodiment can more reliably increase the adhesion to the electrode composite material layer used as the electrodes of the electrochemical device.

The number average molecular weight of the resin is preferably 500 to 10,000, more preferably from 1,000 to 5,000, and even more preferably from 2,000 to 4,000, in terms of inhibiting the increase in viscosity of the liquid composition.

(Dispersant)

The liquid composition for electrode of the present embodiment preferably contains a dispersant. The dispersant is not particularly limited if the dispersant has the function of dispersing the inorganic particles in the dispersion medium, but is preferably a polymer dispersant having a molecular weight of less than 40,000. The polymeric dispersant includes a polymeric dispersant having a dispersible group that can be dispersed in the solvent and an adsorptive group that can be adsorbed to inorganic particles.

When the inorganic particles are charged, the adsorptive group is preferably an ionic group having the opposite polarity to the polarity to which the inorganic particles are charged, in terms of the adsorptive strength with respect to the inorganic particles.

Examples of the ionic groups include sulfonic acid groups and their salts (for example, potassium salts, sodium salts, lithium salts, and ammonium salts), carboxyl groups and their salts (for example, potassium salts, sodium salts, lithium salts, and ammonium salts), primary, secondary, tertiary amino groups and their salts.

The ionic group may be either an anionic group or a cationic group, but is preferably an anionic group in terms of dispersibility of the inorganic particles.

Examples of anionic groups include salts of carboxyl groups, salts of sulfonic acid groups, salts of phosphate groups, and the like.

Ionic groups are usually present on the side chains or both terminals of a polymeric dispersant, but there is preferably an ionic group on the side chains of the polymeric dispersant in order to inhibit the increase in viscosity of the liquid composition.

The dispersible group may have a structure that is soluble in the solvent. However, when used as a lithium ion secondary battery, an oligoether group is preferably used from the viewpoint of ion conductivity.

The oligoether group is a group from which the hydroxyl group is removed from the terminal of a polymer of ethylene glycol or propylene glycol.

The molecular weight of the polymer of ethylene glycol or propylene glycol is preferably 100 to 10,000, and more preferably 100 to 5,000. When the molecular weight of the polymer of ethylene glycol or propylene glycol is 100 or more, the dispersibility of the particles is improved, and when the molecular weight is 10,000 or less, the increase in the viscosity of the liquid composition can be suppressed.

The terminal, in which the oligoether group is not bonded, may be a hydroxyl group, a methoxy group, an ethoxy group, a propoxy group, or the like.

The dispersant may be a random copolymer, alternating copolymer, block copolymer, graft copolymer, or the like.

Of these, the block copolymer and the graft copolymer are more preferably used from the viewpoint of dispersion stability of the inorganic particles. In order to improve the dispersibility of inorganic particles, terminal or terminal substituents may be substituted with ionic groups that can be adsorbed to inorganic particles.

Examples of the dispersants include polymeric compounds containing a polymeric polycarboxylic acid and its salts, a polyoxyethylene group, a polyoxypropylene group, and the like, and not dissolved in a non-polar solvent or not dissolved in a mixture containing a non-polar solvent, and the like.

The mass ratio of the dispersant to the inorganic particles can be adjusted as appropriate. The mass ratio is preferably 0.01 to 10% and more preferably 0.1 to 10% from the viewpoint of the dispersibility of the inorganic particles. If the mass ratio is within the above-described preferred range, the increase in viscosity of the liquid composition for electrode is suppressed and the viscosity of the liquid composition for electrode can be 30 mPa·sec. or less.

Examples of commercially available dispersants include MALIALIM (Registered Trademark)SC-0708A, MALIALIM (Registered Trademark)SC-055K, MALIALIM (Registered Trademark) HKM-050A, MALIALIM (Registered Trademark) HKM150A, MALIALIM (Registered Trademark)SC-1015F, MALIALIM (Registered Trademark) AKM-0531 (hereinafter, manufactured by NOF Corporation), Nopcospers 092, SN Dispersant 9228, SN Sparse 2190 (hereinafter, manufactured by SAN NOPCO LIMITED), DISPER-BYK103, DISPER-BYK2000, DISPER-BYK2001 (hereinafter, manufactured by BYK), and the like.

Dispersion Medium

The dispersion medium is not particularly limited if the inorganic particles can be dispersed, and water and non-aqueous solvents can be used.

Examples of non-aqueous solvents include lactams, alcohols, sulfoxides, esters, ketones, ethers, glycols, and the like. These may be used alone or in combination with two or more solvents.

Examples of lactams include 1-methyl-2-pyrrolidone, 2-pyrrolidone, and the like.

Examples of alcohols include methanol, ethanol, n-propanol, isopropyl alcohol (IPA), n-butanol, isobutanol, tert-butanol, n-pentanol, n-hexanol, diacetone alcohol, cyclohexanol, propylene glycol monopropyl ether, and the like.

Examples of sulfoxides include dimethyl sulfoxide and the like.

Examples of esters include ethyl acetate, butyl acetate, ethyl lactate, ethylene carbonate, ethylene glycol diacetate, and the like.

Examples of ketones include methyl ethyl ketone, diethyl ketone, ethyl acetate, butyl acetate, ethyl butyrate, ethyl lactate, diisobutyl ketone, 2-butanone, 2-pentanone, diacetone alcohol, and the like.

Examples of ethers include propylene glycol monopropyl ether and the like.

Examples of glycols include propylene glycol, ethylene glycol, isopropyl alcohol, ethylene glycol, triethylene glycol, hexylene glycol, propylene glycol, diacetone alcohol, cyclohexanol, and the like.

The dispersion medium may also use a mixture containing the above-described non-polar solvents or other non-polar solvents.

The liquid composition for electrode in accordance with the present embodiment contains 1.0 to 10.0% by mass of inorganic particles relative to the liquid composition for electrode. If the concentration of the inorganic particles is 1.0 to 10.0% by mass, the increase in viscosity of the liquid composition for electrode is suppressed and the viscosity of the liquid composition for electrode can be reduced to 30 mPa·sec. or less.

The liquid composition for electrode of the present embodiment has a viscosity of 30 mPa·sec. or less. When the viscosity is 30 mPa·sec. or less, it can be determined that the liquid composition for electrode of the present embodiment has sufficiently low viscosity to be a liquid composition that can be dispensed in an ink jet method.

The viscosity of the liquid composition for electrode of the present embodiment can be measured using a general method for measuring, for example, a TV 25-type viscometer TV-25 (manufactured by TOKI SANGYO Co., Ltd.). When the viscosity of the liquid composition for electrode of the present embodiment is not more than a predetermined value (for example, 30 mPa·sec.), it may be determined that the liquid composition for electrode of the present embodiment is a low viscosity liquid composition for the electrode. When the liquid composition for electrode is formed as a low viscosity liquid composition for electrode, when the liquid composition for electrode is applied onto the electrode composite material layer, the liquid composition for electrode can be applied substantially uniformly to the subject to be coated. In addition, if the liquid composition for electrode is formed as a low viscosity liquid composition for electrode, the low viscosity liquid composition for electrode can be discharged stably when it is discharged in an ink jet method.

An example of a method of manufacturing the liquid composition for electrode of the present embodiment will be described.

First, the dispersion liquid is obtained by mixing inorganic particles, dispersant, and solvent with a disperser.

The disperser is not particularly limited, and may be one which is capable of mixing and dispersing inorganic particles, dispersants, and solvents. For example, LABSTAR Mini LMZ015 (manufactured by Ashizawa Finetech Ltd.) may be used as the disperser. In this case, a specified amount of alumina balls can be inserted into the zirconia container for continuous processing. The dispersion liquid is obtained by dispersing the inorganic particles, the dispersant, and the solvent and performing batch treatment for a predetermined number of times.

Then, by adding a mixture of resin and added solvent to the dispersion liquid, the liquid composition for electrode containing a predetermined concentration of inorganic particles is obtained.

A solvent similar to the solvent contained in the dispersion liquid may be used as the added solvent.

The liquid composition for electrode is fabricated by preparing the dispersion liquid and the mixture separately and adding the mixture to the dispersion liquid. This improves the dispersibility of the liquid composition for electrode.

The resin and the added solvent may be added to the dispersion liquid separately.

The liquid composition for electrode of the present embodiment includes inorganic particles, a resin, and a dispersion medium, wherein the resin is soluble in a non-polar solvent or a mixture containing a non-polar solvent, and the resin has an ethylene oxide chain in the main chain. A lithium ion secondary battery includes a laminated electrode device in which a separator is arranged between the electrodes in the electrolyte. The lithium ion secondary battery generally includes a non-polar solvent such as dimethyl carbonate and ethyl methyl carbonate. The electrodes included in the electrode device are generally formed by laminating at least an electrode substrate (current collector) and an electrode composite material layer having a porous structure, wherein the electrode composite material layer is in contact with the electrode substrate and the separator. If the liquid composition for the electrode is applied to the surface of the electrode composite material layer to form a layer (an isolation layer which will be described later), the inorganic particles contained in the layer in which the electrode is disposed in the electrolyte can maintain close contact with the electrode composite material layer. Therefore, when the liquid composition for the electrode of the present embodiment is used as an electrode of an electrochemical device such as a lithium ion secondary battery, an isolation layer having adhesion property to the electrode composite material layer can be provided.

Many inorganic particles have heat resistance in general. If adhesion to the composite material layer is achieved in the electrolytic solution, the heat generation can be controlled to a certain extent even when abnormal heat generation, smoke generation, or ignition occurs, and as a result, safety can be assured.

In addition, the liquid composition for the electrode of the present embodiment can further form an outermost layer on a battery contained in an electrochemical device, thereby increasing the strength of the electrochemical device against external piercing. Therefore, the liquid composition for the electrode of the present embodiment can have high safety against puncturing when used as the electrode of the electrochemical device.

In addition, the safety of the electrochemical device by puncturing the device can be evaluated by performing the following, as described below. That is, the electrochemical device is disposed within the case, an electrolyte is injected, and then left for a predetermined period of time (for example, 12 hours). Thereafter, the electrochemical device is initially charged at constant current at a predetermined current rate (for example, 0.2 C), as a CCCV mode, to a cut-off voltage (for example, 4.2 V) under a 25° C. environment. Then, the electrochemical device is charged at a constant voltage (CV) for a predetermined period of time, and allowed to stand at 25° C. for a predetermined period of time. Thereafter, charging is stopped at 25° C. for a predetermined period of time. The electrochemical device is then charged at a predetermined current rate (for example, 0.2 C), as a CCCV mode, up to a cut-off voltage (for example, 4.2 V). Thereafter, the electrochemical device is discharged at constant current at a predetermined current rate (for example, 0.2 C), as a CC mode, to a cut-off voltage (for example, 2.5 V). The electrochemical device is then charged at a predetermined current rate (for example, 0.2 C), as a CCCV mode, to a cut-off voltage (for example, 4.2 V), and is charged at the constant voltage for a predetermined period of time (for example, 5 hours). Then, the center of the fully charged electrode device is punctured with a nail having a predetermined diameter (for example, φ of 4.5 mm) to check the voltage, temperature, smoke, ignition, and the like, and to evaluate the safety of the electrochemical device.

The liquid composition for the electrode of the present embodiment can have a viscosity of 30 mPa·sec. or less. Accordingly, when the liquid composition for the electrode of the present embodiment is used for the electrode of the electrochemical device, the adhesion to the electrode composite material layer can be enhanced because inorganic particles can be easily placed on the entire surface of the electrode and the unevenness of the electrode surface can be reduced. Therefore, when the liquid composition for the electrode of the present embodiment is used as the electrode of the electrochemical device, the adhesion to the electrode composite material layer and the liquid composition for the electrode can be enhanced more reliably.

The viscosity of the liquid composition for the electrode of the present embodiment can be measured using a general measurement method as described above. For example, the viscometer TV-25 (manufactured by TOKI SANGYO Co., Ltd.) can be used to measure the viscosity of the liquid composition for the electrode. When the viscosity of the liquid composition for electrode according to the present embodiment is not more than a predetermined value (for example, 30 mPa·sec.), it may be determined that the liquid composition for the electrode of the present embodiment is a low viscosity liquid composition for the electrode.

The liquid composition for the electrode of the present embodiment has the properties described above and can be effectively used for electrodes of electrochemical devices. Examples of the electrochemical devices include a lithium ion secondary battery, an electric double layer capacitor, a lithium ion capacitor, a redox capacitor, and the like. In particular, the liquid composition for the electrode of the present embodiment can be used as the outermost layer of the electrode to maintain a stable connection. Therefore, the electrochemical device can be suitably used for a non-aqueous electrolyte secondary battery having a high energy density.

<Electrode>

An electrode of the present embodiment will be described. FIG. 1 is a cross-sectional view illustrating the structure of an electrode of the present embodiment. In this specification, the three-dimensional orthogonal coordinate system (in the X-axis direction, the Y-axis direction, and the Z-axis direction) is used in 3-dimensional axes, and the coordinates of the electrode on the main surface are in the X-axis direction and the Y-axis direction, and the height direction (in the thickness direction) is in the Z-axis direction. The direction from the bottom of the electrode to the top is in the +Z-axis direction, and the opposite direction is in the −Z-axis direction. In the following description, the +Z-axis direction is referred to as upper or top, and the −Z-axis direction is referred to as lower or bottom, for the sake of convenience. However, these do not represent a universal vertical relationship.

As illustrated in FIG. 1, the electrode 10 of the present embodiment includes an electrode substrate 11 and a pair of isolation layers 12, wherein the isolation layers 12 are arranged on both the top and bottom surfaces of the electrode substrate 11. The electrode 10 can have any shape, such as a sheet and the like.

Electrode Substrate

As illustrated in FIG. 1, the electrode substrate 11 may include an electrode substrate (current collector) 111 and a pair of electrode composite material layers 112, wherein the electrode composite material layers 112 are arranged on both the upper and lower surfaces of the electrode substrate 111. That is, the electrode substrate 111, the electrode composite material layers 112, and the isolation layers 12 may be laminated in this order from the side of the electrode substrate 111 to both the top and bottom surfaces of the electrode substrate 111.

The electrode substrate 111 is formed into a sheet.

A copper foil, an aluminum foil, or the like may be used as the electrode substrate 111.

The electrode composite material layer 112 may be disposed on both the top and bottom surfaces of the electrode substrate 111, as illustrated in FIG. 1, or the electrode composite material layer 112 may be disposed only on one of the top or bottom surfaces of the electrode substrate 111.

The electrode composite material layers 112 includes an active material.

Active Materials

Active materials can be selected in accordance with the type of electrode, and the positive electrode active material or the negative electrode active material can be used. The positive electrode active material or the negative electrode active material may be used alone or in combination with two or more materials.

The positive electrode active material is not particularly limited as long as the positive electrode active material can intercalate or de-intercalate alkali metal ions. Preferably, an alkali metal-containing transition metal compound may be used.

Examples of alkali metal-containing transition metal compounds include lithium-containing transition metal compounds such as composite oxides containing lithium and one or more elements selected from the group consisting of cobalt, manganese, nickel, chromium, iron, and vanadium.

Examples of lithium-containing transition metal compounds include lithium cobaltate, lithium nickelate, lithium manganate, and the like.

As the alkali metal-containing transition metal compound, a polyanionic compound having an $XO_4$ tetrahedra (X=P, S, As, Mo, W, Si, and the like) in the crystalline structure may also be used. Among these, a lithium-containing transition metal phosphate compound, such as lithium iron phosphate, lithium vanadium phosphate, and the like is preferably used from the viewpoint of the cycle characteristics of a non-aqueous electric storage device. Vanadium lithium phosphate is particularly preferably used in terms of lithium diffusion coefficient and output characteristics of the non-aqueous electric storage device.

The surface of the polyanionic compound is preferably coated and composited with a conductive aid such as carbon material and the like from the viewpoint of electronic conductivity.

The negative electrode active material is not particularly limited as long as the negative electrode active material can intercalate or de-intercalate alkali metal ions. Examples of the negative electrode active materials include carbon materials including graphite having a graphite-type crystalline structure; lithium titanate, titanium oxide; high capacity materials such as silicon, tin, silicon alloys, tin alloys, silicon oxide, silicon nitride, tin oxide, and the like. Among these, a high capacity material is preferably used in terms of the energy density of the non-aqueous electric storage device.

Examples of the carbon materials include natural graphite, artificial graphite, non-graphitizable carbon (hard carbon), easily graphitizable carbon (soft carbon), and the like.

The electrode composite material layer 112 may include a resin or the like for forming the electrode composite material layer to improve adhesion. The resin for forming the electrode composite material layer may be used in an electrochemical device, for example, styrene butadiene resin (SBR), acrylic resin, urethane resin, polyvinyl pyrrolidone (PVP), polyvinylidene fluoride (PVDF), or the like. The forms of the resins for forming the electrode composite material layers may be resins that are dissolved and utilized, resins that are used as particles, and resins that are formed using a monomer and an initiator, and the like. The initiator contained in the resin for forming the electrode composite material layer may be an initiator be photo-curing, thermo-curing, and the like.

The electrode substrate 11 may suitably have a volume density. The volume density may be, for example, 1.6±0.1 $mg/cm^3$.

As illustrated in FIG. 1, a pair of the isolation layers 12 is disposed on main surfaces located opposite the electrode substrate 111 of a pair of the electrode composite material layers 112. The isolation layer 12 includes a cure product of the liquid composition for the electrode of the present embodiment, and is formed using the liquid composition for the electrode of the present embodiment. That is, the isolation layer 12 includes inorganic particles. The inorganic particles and resins are the same as the inorganic particles and the resins contained in the liquid composition for the electrode of the present embodiment. Therefore, the detailed explanation will be omitted.

The isolation layer 12 is formed on both the upper and lower surfaces of the electrode substrate 11. However, the isolation layer 12 may be provided only on the upper or lower main surface.

FIG. 2 is a planar view illustrating a configuration of the electrode of the present embodiment. As illustrated in FIG. 2, the electrode 10 may include an electrode drawer 111A protruding from the electrode substrate 11 in the −X-axis direction at one side (the side in the +Y-axis direction) of the electrode substrate 11. The electrode drawer 111A is an area without the isolation layer 12 on its surface, and can be connected by bonding external drawer wires or the like.

In the present embodiment, the position of the electrode drawer 111A is not particularly limited, and the electrode drawer 111A can be suitably designed. For example, the electrode drawer 111A may be provided on one side of the electrode substrate 11 (the side in the +Y-axis direction) in the +X-axis direction, or may be provided on one side of the electrode substrate 11 (the side in the −Y-axis direction) in the +X-axis direction or the −X-axis direction. The electrode drawer 111A may be provided in the +Y-axis direction or the −Y-axis direction of one side (the side in the −X-axis direction) of the electrode substrate 11.

Electrodes can be manufactured using any suitable method, depending on whether the electrode is a positive or negative electrode. An example of a method of manufacturing an electrode will be described.

The electrode composite material layer 112 is formed by coating the composition for forming the electrode composite material layer on the electrode substrate 111 (a step of forming the electrode composite material layer 112).

The composition for forming the electrode composite material layer includes an active material and a dispersion medium, and may further include a conductive aid, a dispersant, and the like, as needed.

In the case of a positive electrode, a positive electrode active material is used as an active material. In the case of a negative electrode, a negative electrode active material is used as an active material.

Examples of the dispersion media include aqueous dispersion media such as water, ethylene glycol, propylene glycol, and the like; and organic dispersion media such as N-methyl-2-pyrrolidone, 2-pyrrolidone, cyclohexanone, butyl acetate, mesitylene, 2-n-butoxymethanol, 2-dimethylethanol, N,N-dimethylacetamide, and the like. These may be used alone or in combination with two or more dispersion media.

Examples of conductive aids include a carbon black manufactured by a furnace method, an acetylene method, a gasification method, and the like; and carbon materials such as carbon nanofibers, carbon nanotubes, graphene, graphite particles, and the like. Conductive aids other than the carbon materials include a metal particle such as aluminum or a metal fiber. The conductive aid may be pre-composited with the active material.

Examples of the dispersants include polymer dispersants such as a polycarboxylic acid-based dispersant, a naphthalene sulfonate-based formalin condensation-based dispersant, a polyethylene glycol, a polycarboxylic acid-partial alkyl ester-based dispersant, a polyether-based dispersant, a polyalkylene polyamine-based dispersant, and the like; surfactants such as an alkyl sulfonate-based dispersant, a quaternary ammonium salt-based dispersant, a high-grade alcohol alkylene oxide-based dispersant, a polyvalent alcohol ester-based dispersant, an alkyl polyamine-based dispersant; and an inorganic-type dispersant such as a polyphosphate-based dispersant; and the like.

The electrode composite material layer 112 can be formed by placing the electrode substrate 111 on a base (stage) and applying the composition for forming the electrode composite material layer on one of the electrode substrates 111 and heating the electrode composite material layer.

The composition for forming the electrode composite material layer can be applied over the electrode substrate 111 using any suitable coating device.

The coating devices of the liquid composition for the electrode composite material layer is not particularly limited, and any suitable printing device may be used. For example, a lithographic printing device, a letterpress printing device, a concave printing device, a porous printing device, a dipping, a comma coater, a die coater, a curtain coater, a spray coating, an ink jet, or the like may be used. Among these, ink jet printing is preferably used in that the thin film can be printed on the substrate of the thin layer without contact, thereby reducing the material cost and suppressing the waste material.

Any suitable heating method can be used to heat the composition for forming the electrode composite material layer applied to the electrode substrate 111. The composition for forming the electrode composite material layer may be heated using a base capable of heating, by a heating mechanism other than the base, or by irradiation with ultraviolet light.

A heating mechanism is not particularly limited as long as the heating mechanism does not come into direct contact with the composition for forming the electrode composite material layer. Examples of the heating mechanisms include a resistive heater, an infrared heater, a fan heater, and the like.

A plurality of heating mechanisms may be provided.

A heating temperature is not particularly limited, and preferably from 70 to 150° C. in terms of energy use.

The electrode composite material layer 112 can be formed by forming the electrode composite material layer 112 on one main surface of the electrode substrate 111 and then similarly applying and heating the composition for forming the electrode composite material layer on the other main surface of the electrode substrate 111.

The electrode substrate 11 may also be pressed to stabilize the electrode substrate 11 to have an optimum volume density as appropriate.

Then, the liquid composition for the electrode of the present embodiment is applied on the main surface (the main surface opposite to the electrode substrate 11) of one of the electrode composite material layer 112 to form the isolation layer 12 (a step of forming the isolation layer).

The liquid composition for electrode of the present embodiment can be applied over the electrode composite material layer 112 using an electrode manufacturing device.

(Electrode Manufacturing Device)

FIG. 3 is a schematic diagram illustrating an example of a configuration of an electrode manufacturing device of the present embodiment. As illustrated in FIG. 3, the electrode manufacturing device 1 manufactures an electrode using the liquid composition for the electrode P of the present embodiment. The electrode manufacturing device 1 includes a printing unit 2, a heating unit 3, and a conveying unit 4.

—Printing Unit—

The printing unit 2 applies the liquid composition P for electrode on a printing substrate 5 to form a liquid composition layer for electrode. The printing unit 2 includes a storage container 2*a* for containing the liquid composition for electrode P, a printing device 2*b* which is a unit to provide the liquid composition for electrode P on the printing substrate 5, and a supply tube 2*c* for supplying the liquid composition for electrode P stored in the storage container 2*a* to the printing device 2*b*.

At the time of printing, the printing unit 2 supplies the liquid composition P for the electrode contained in the storage container 2*a* to the printing device 2*b* and discharges the liquid composition P for the electrode from the printing device 2*b* onto the printing substrate 5. Thus, the liquid composition P for the electrode is applied onto the printing substrate 5 to form a thin film liquid composition layer for the electrode.

The storage container 2*a* can optionally be selected so that the liquid composition P for the electrode can be stored stably. The storage container 2*a* has a configuration integrated with the electrode manufacturing device 1 or the storage container 2*a* may have a configuration removable from the electrode manufacturing device 1. The storage container 2*a* may be a container used for adding to the storage container integrated with the electrode manufacturing device 1. Alternatively, the storage container 2*a* may be a container used for adding to the storage container that can be removed from the electrode manufacturing device 1.

The printing device 2*b* is not particularly limited as long as the printing device can provide the liquid composition for the electrode P. The printing device 2*b* may be any printing apparatus corresponding to various printing methods such as spin coating, casting, micro gravure coating, gravure coating, bar coating, roll coating, wire bar coating, dip coating, slit coating, capillary coating, spray coating, nozzle coating, gravure coating, screen printing, flexographic printing, offset printing, reverse printing, and ink jet printing.

The supply tube 2*c* can optionally be selected if the liquid composition for the electrode P can be stably supplied.

—Heating Unit—

The heating unit 3 heats the liquid composition P for the electrode to obtain the porous resin. The heating unit 3 has a heating device 3*a* as illustrated in FIG. 1.

The heating device 3*a* removes the residual solvent in the liquid composition for the electrode P by heating and drying it. This results in the formation of an electrode.

The heating unit 3 may heat the residual solvent in the liquid composition for the electrode P under reduced pressure.

The heating unit 3 removes the liquid composition P for the electrode by heating and drying it with the heating device 3*a*.

The heating unit 3 preferably heats under reduced pressure after heating the solvent contained in the liquid composition for the electrode P.

The heating device 3*a* is not particularly limited as long as the heating device satisfies the above-described function. For example, an IR heater, a hot air heater, or the like may be used.

In addition, the heating temperature and the heating time may be appropriately selected depending on the boiling point and the thickness of the forming film of the solvent contained in the liquid composition for the electrode P.

—Conveying Unit—

The conveying unit 4 conveys the printing substrate 5 at a preset speed in the order of the printing unit 2 and the heating unit 3. The conveying unit 4 may be capable of conveying the printing substrate 5. For example, a conveying belt or the like may be used.

—Printing Substrate—

Any material, transparent or opaque, can be used as the printing substrate 5. That is, the printing substrate 5 may be a transparent substrate such as a resin film substrate, for example, a glass substrate, various plastic films, and a composite substrate thereof. As an opaque substrate, various types of substrate can be used such as a silicon substrate, a metal substrate such as stainless steel, and laminates thereof.

The printing substrate 5 may be a recording medium such as a plain paper, a glossy paper, a special paper, cloth, or the like. The recording medium may be a low-permeability substrate (low-absorbency substrate). The low-permeability substrate refers to a substrate having a surface that is water-permeable, absorbent, or poorly adsorbed, including a material that has a large number of cavities therein but is not open to the outside. Examples of the low-permeability substrates include recording media such as a coated paper used for commercial printing, a paperboard with recovered paper pulp blended in the middle and back layers and coated on the surface.

The printing substrate 5 may also be a porous resin sheet that is used as an insulating layer for an electric storage device or a power generating device.

The shape of the printing substrate 5 may have a curved surface or an irregular shape, and may be used if the substrate is applicable to the printing unit 2.

The liquid composition for the electrode of the present embodiment may be formed by applying the liquid composition for the electrode P to the electrode composite material layer 112 using a coating device in the same manner as the composition for forming the electrode composite material layer instead of the electrode manufacturing device. The coating device of the liquid composition for the electrode P of the present embodiment is not particularly limited, and any suitable printing device can be used. Examples of the printing devices include lithographic printing, letterpress printing, concave printing, porous printing, dipping, a comma coater, a die coater, curtain coating, spray coating, an ink jet, or the like. Among these, an ink jet printing is preferably used in that the thin film can be printed on the substrate of the thin layer without contact, thereby reducing the material cost and suppressing the waste material.

The liquid composition for the electrodes of the present embodiment can be heated under the same heating conditions as those for the composition for forming the electrode composite material layer.

The first isolation layer 12 is formed on the main surface (the main surface opposite to the electrode substrate 11) of one of the electrode composite material layers 112. Similarly, the liquid composition for the electrode of the present invention is coated on a main surface of the other electrode composite material layer 112 (the main surface opposite to the electrode substrate 11) and is heated to form a second isolation layer 12. As a result, the electrode 10 can be obtained.

Then, the electrode 10 is punched out using a laser processing machine and cut to a desired size to obtain the electrode 10 having the desired size.

The electrode 10 includes a curable material of the liquid composition for the electrode of the present embodiment in the isolation layers 12. Therefore, when the electrode 10 is used as the electrode of an electrochemical device, excellent adhesion to the electrode composite material layer is exerted.

The electrode 10 has the characteristics as described above. Therefore, the electrode 10 can be efficiently used as a battery for an electrochemical device. Among the electrochemical devices, the electrode 10 is preferably used for a non-aqueous electrolyte secondary battery because the electrode 10 can maintain a stable connection state by using the isolation layers 12 as the outermost layers.

<Electrochemical Device>

An electrochemical device to which the electrode of the present embodiment is applied will be described. The electrode of the present embodiment can be used for positive and negative electrodes of the electrochemical device. In the present embodiment, the case in which the electrode of the present embodiment is used as the negative electrode will be described. The electrode of the present embodiment may be used as a positive electrode or both positive and negative electrodes.

FIG. 4 is a cross-sectional view illustrating a configuration of the electrochemical device of the present embodiment. As illustrated in FIG. 4, the electrochemical device 100 includes an electrode device 20, an electrolyte 30, and an outer case 40, wherein the electrode device 20 is positioned within the outer case 40 in which the electrolyte 30 is filled.

The electrode device 20 includes a positive electrode 21, a separator 22, and a negative electrode 23, and may have other members as needed. The electrode device 20 is configured as a plurality of layers of the positive electrodes 21 and the negative electrodes 23 through the separators 22 between the positive electrode 21 and the negative electrode 23, and disposes the positive electrode 21 or the negative electrode 23 in the lowest layer and the top layer. In the present embodiment, the negative electrodes 23 are placed at the bottom layer and the top layer of the electrode device 20.

The number of layers of the positive electrode 21 and negative electrode 23 is not particularly limited and can be suitably designed. The number of positive electrodes 21 and negative electrodes 23 may be the same or different. In the present embodiment, the number of negative electrodes 23 is one more than the number of positive electrodes 21.

In the electrode device 20, one end of the drawer wire 24A and 24B is connected to the positive drawer 211A-1 of the positive electrode 21 and the negative drawer 231A-1 of the negative electrode 23, and the other end of the drawer wire 24A and 24B is drawn out to the exterior of the outer case 40.

An arrangement of the positive electrode 21, the separator 22, and the negative electrode 23 in a planar view of the electrode device 20 is illustrated in FIG. 5. As illustrated in FIG. 5, in the planar view of the electrode device 20, the positive electrode 21 and the negative electrode 23 may be formed to be smaller than the separator 22 and the positive electrode 21 may be formed to be smaller than the negative electrode 23, except for the positive electrode drawer 211A-1 and the negative electrode drawer 231A-1. The positive electrode 21 and the negative electrode 23 may have the same area as the separator 22 except for the positive electrode drawer 211A-1 and the negative electrode drawer 231A-1. The positive electrode 21 may be the same size as the negative electrode 23, and the positive electrode 21 may be larger than the negative electrode 23.

As illustrated in FIG. 4, the positive electrode 21 is composed of a positive electrode substrate 211 and includes a positive electrode substrate 211A and a positive electrode composite material layer 211B provided on both sides of the positive electrode substrate 211A.

The positive electrode substrate 211A includes a positive electrode drawer 211A-1 extending from a part of the outer circumference thereof, and the positive electrode drawer 211A-1 is connected to the drawer wire 24A.

The positive electrode substrate 211A and the positive electrode composite material layer 211B can use similar materials with the electrode substrate 111 and the electrode composite material layer 112 that are provided when the above-described electrode 10 is the positive electrode. Therefore, the details thereof will be omitted.

As illustrated in FIG. 4, the separator 22 is provided between the positive electrode 21 and the negative electrode 23 and has a function of preventing short circuiting between the positive electrode 21 and the negative electrode 23.

Examples of the separator 22 include paper such as kraft paper, vinylon mixed paper, synthetic pulp mixed paper, polyolefin non-woven fabric such as cellophane, polyethylene graft film, polypropylene meltblown non-woven fabric, polyamide non-woven fabric, glass fiber non-woven fabric, micropore film, resin film, and the like.

The size of the separator 22 is not particularly limited and may be suitably designed if the separator 22 can be used in an electrochemical device.

The separator 22 may be a single layer structure or a laminated structure.

When the non-aqueous electrolyte is a solid electrolyte, the electrode device 20 does not need to include the separator 22.

As illustrated in FIG. 4, the negative electrode 23 is laminated to both sides of the positive electrode 21 via the separator 22. The negative electrode 23 includes a negative electrode substrate 231 and an isolation layer 232 on both sides thereof.

The negative electrode substrate 231 includes a negative electrode substrate 231A and a negative composite material layer 232B disposed on both sides of the negative electrode substrate 231A.

The negative electrode substrate 231 can use similar materials with the electrode substrate 11 that is provided when the above-described electrode 10 is the negative electrode. Therefore, the details thereof will be omitted.

The isolation layer 232 can use similar materials with the isolation layer 12 that is provided in the above-described electrode 10. Therefore, the details thereof will be omitted.

The electrolyte 30 is composed of an aqueous electrolyte or a non-aqueous electrolyte.

The aqueous electrolyte contains an electrolyte salt and water.

Examples of the electrolyte salt constituting the aqueous electrolytes include sodium hydroxide, potassium hydroxide, sodium chloride, potassium chloride, ammonium chloride, zinc chloride, zinc acetate, zinc bromide, zinc iodide, zinc tartrate, zinc perchlorate, and the like.

As a non-aqueous electrolyte, a non-aqueous electrolyte or a solid electrolyte may be used.

A non-aqueous electrolytic solution is an electrolytic solution in which electrolyte salts (especially electrolyte salts containing halogen atoms) are dissolved in a non-aqueous solvent.

Electrolyte salts are not particularly limited as long as the electrolyte salts have high ionic conductivity and can be dissolved in a non-aqueous solvent.

The electrolyte salts preferably contain halogen atoms.

Examples of cations constituting the electrolyte salts include lithium ions and the like.

Examples of the anions constituting the electrolyte salts include $BF_{4-}$, $PF_{6-}$, $AsF_{6-}$, $CF_3SO_{3-}$, $(CF_3SO_2)_2N^-$, $(C_2F_5SO_2)_2N^-$, and the like.

As the electrolyte salts, for example, a lithium salt which is a supporting salt can be used. Lithium salt which is a supporting salt is not particularly limited and can be suitably selected depending on the purpose. Examples of the lithium salts include lithium hexafluorophosphate ($LiPF_6$), lithium borofluoride ($LiBF_4$), lithium arsenide ($LiAsF_6$), lithium trifluorometasulfonate ($LiCF_3SO_3$), lithium bis (trifluoromethylsulfonyl) imide ($LiN(CF_3SO_2)_2$), lithium bis (pentafluoroethylsulfonyl) imide ($LiN(C_2F_5SO_2)_2$), and the like. Among these, $LiPF_6$ is preferably used from the viewpoint of ionic conductivity, and $LiBF_4$ is preferably used from the viewpoint of stability.

The electrolyte salts may be used alone or in combination with two or more electrolyte salts.

The concentration of the electrolyte salt in the non-aqueous electrolytic solution can be appropriately selected depending on the purpose. However, the concentration of the electrolyte salt is preferably 1 mol/L to 2 mol/L when the non-aqueous electric storage device is of the swing type, and 2 mol/L to 4 mol/L when the non-aqueous electric storage device is of the reservoir type.

The non-aqueous solvent is not particularly limited, and can be appropriately selected depending on the purpose. For example, a non-protic organic solvent is preferably used.

As the aprotic organic solvent, a carbonate-based organic solvent, such as a chain carbonate or a cyclic carbonate, may be used. Of these, the chain carbonate is preferably used because the chain carbonate has high solubility of the electrolyte salt. Furthermore, the aprotic organic solvent having a low viscosity is preferably used.

Examples of the chain carbonate include dimethyl carbonate (DMC), diethyl carbonate (DEC), methyl ethyl carbonate (EMC), and the like.

The content of the chain carbonate in the non-aqueous solvent is not particularly limited, and can be appropriately selected depending on the purpose. The content of the chain carbonate in the non-aqueous solvent is preferably 50% by mass or more. If the content of the chain carbonate in the non-aqueous solvent is 50% by mass or more, the content of the cyclic material is reduced even if the non-aqueous solvent other than the chain carbonate is a cyclic material (e.g., cyclic carbonate, cyclic ester) with a high dielectric constant. Therefore, even when a non-aqueous electrolytic solution having a high concentration of 2 M or more is manufactured, the viscosity of the non-aqueous electrolytic solution decreases, and impregnation and ion diffusion into the electrode of the non-aqueous electrolytic solution becomes excellent.

Examples of the cyclic carbonates include propylene carbonate (PC), ethylene carbonate (EC), butylene carbonate (BC), vinylene carbonate (VC), and the like.

The non-aqueous solvent other than the carbonate-based organic solvent may be, for example, an ester-based organic solvent such as a cyclic ester or a chain ester, an ether-based organic solvent such as a cyclic ether or a chain ether, or the like.

Examples of cyclic esters include γ-butyrolactone (γBL), 2-methyl-γ-butyrolactone, acetyl-γ-butyrolactone, γ-valerolactone, and the like.

Examples of chain esters include alkyl propionate ester, dialkyl malonate ester, alkyl acetate ester (for example, methyl acetate, ethyl acetate), alkyl formate ester (e.g., methyl formate, ethyl formate), and the like.

Examples of cyclic ethers include tetrahydrofuran, alkyltetrahydrofuran, alkoxytetrahydrofuran, dialkoxytetrahydrofuran, 1,3-dioxolane, alkyl-1,3-dioxolane, 1,4-dioxolane, and the like.

Examples of chain ethers include 1,2-dimethoxyquiethane, diethyl ether, ethylene glycol dialkyl ether, diethylene glycol dialkyl ether, triethylene glycol dialkyl ether, tetraethylene glycol dialkyl ether, and the like.

As a non-aqueous electrolytic solution, a mixture containing the above-described non-polar solvent may be used.

Solid electrolytes are capable of withstanding high voltages, have electronic insulation, and exhibit ionic conductivity. The material constituting the solid electrolyte layer is not particularly limited; as long as the material has an electronic insulation and exhibits an ionic conductivity, any suitable material may be used. As a material constituting a solid electrolyte layer, a sulfide-based solid electrolyte or an oxide-based solid electrolyte is preferably used from the viewpoint of having a high ionic conductivity.

Examples of the sulfide-based solid electrolyte include $Li_{10}GeP_2S_{12}$ or $Li_6PS_5X$ (where X is F, Cl, Br or I) having an argyrodite-type crystal structure.

Examples of the oxide-based solid electrolytes include LLZ ($Li_7La_3Zr_2O_{12}$) having a garnet-type crystal structure or LATP ($Li_{1+x}Al_xTi_2O_x$ $(PO_4)_3$) having a NASICON-type crystal structure ($0.1 \leq X \leq 0.4$), LLT ($Li_{0.33}La_{0.55}TiO_3$) having a perovskite-type crystal structure, and LIPON ($Li_{2.9}PO_{3.3}N_{0.4}$) having an amorphous-type crystal structure. These solid electrolytes may be used alone or in combination with two or more solid electrolytes.

Examples of the electrolyte materials dissolved or dispersed in the liquid to form these solid electrolyte layers include $Li_2S$, $P_2S_5$, LiCl, and the like which are precursors of the solid electrolytes, $Li_2S—P_2S_5$ glass, which is a material of the solid electrolyte, and $Li_7P_3S_{11}$ glass ceramics.

In addition, materials used to form a gel electrolyte layer can also be used as an electrolyte.

The gel electrolyte is not particularly limited as long as the gel electrolyte can demonstrate an ionic conductivity. Examples of polymers constituting the network structure of the gel electrolyte include polyethylene oxide, polypropylene oxide, polyacrylonitrile, polymethyl methacrylate, polyvinyl chloride, copolymers of vinylidene fluoride and propylene hexafluoride, polyethylene carbonate, and the like.

Solvent molecules retained in the gel electrolyte include ionic liquids. Examples of the ionic liquids include methyl-1-propylpyrrolidinium bis (fluorosulfonylimide), 1-butyl-1-methylpyrrolidinium bis (fluorosulfonylimide), 1-methyl-1-propylpiperidinium bis (fluorosulfonylimide), 1-ethyl-3-methylimidazolium bis (fluorosulfonylimide), 1-methyl-3-propylimidazolium bis (fluorosulfonylimide), N,N-diethyl-N-methyl-N-(2-methoxyethyl) ammonium bis (fluorosulfonyl) imide.

The ionic liquid may be a mixture of a liquid and a lithium salt such as tetraglyme, propylene carbonate, fluoroethylene carbonate, ethylene carbonate, diethyl carbonate, or the like.

The lithium salts are not particularly limited and can be appropriately selected depending on the purpose. Examples of the lithium salts include lithium hexafluorophosphate ($LiPF_6$), lithium tetrafluoroborate ($LiBF_4$), lithium hexafluoroarsenate ($LiAsF_6$), lithium trifluorometasulfonate ($LiCF_3SO_3$), lithium bis (trifluoromethylsulfonyl) imide ($LiN(CF_3SO_2)_2$), lithium bis (pentafluoroethylsulfonyl) imide ($LiN(C_2F_5SO_2)_2$), and the like.

These ionic liquids and lithium salts contained in the gel electrolyte may be used alone or in combination with two or more kinds.

To form these gel electrolytes, as the electrolyte material dissolved or dispersed in a liquid, a solution in which the above polymer compound and the ionic liquid or lithium salt are dissolved may be used. As an electrolyte material for dissolving or dispersing in a liquid, a precursor material of a gel electrolyte may be used (for example, a combination of a solution having an ionic liquid or a lithium salt dissolved therein and a polyethylene oxide or polypropylene oxide having both ends as an acrylate group).

When these solid electrolytes and gel electrolytes are used, they can be used as a liquid composition along with active material.

The shape of the electrochemical device 100 is not particularly limited. Examples of the shape of the electrochemical device include a laminate type, a cylinder type in which a sheet electrode and a separator are spiraled, a cylinder type with an in-side out structure in which a pellet electrode and a separator are combined, a coin type in which a pellet electrode and a separator are laminated, and the like.

The electrochemical device 100 may be used as an aqueous or non-aqueous electric storage device by using an aqueous electrolytic solution or a non-aqueous electrolyte as the electrolyte 30.

In the present embodiment, the positive electrode 21 may be an electrode of the above-described embodiment. In this case, the positive electrode 21 includes an isolation layer on both the upper and lower surfaces of the positive electrode substrate 211.

In the present embodiment, the positive electrode composite material layer 211B may be provided only on one of the main surfaces of the positive electrode substrate 211A.

In the present embodiment, the negative electrode 23 may have the negative electrode composite material layer 231B and the isolation layer 232 only on a main surface of one of the surfaces of the negative electrode substrate 231A.

The method of manufacturing the electrochemical device 100 can be any appropriate method. An example of the method of manufacturing the electrochemical device 100 will be described.

First, the positive electrode 21 is prepared. The positive electrode composite material layer 211B is formed by applying and drying the resin composition for forming the positive electrode composite material layer as the composition for forming the electrode composite material on one of the main surfaces (for example, the upper surface) of the positive electrode substrate 211A. Similarly, the positive electrode composite material layer 211B is formed by applying and heating the resin composition for forming the positive electrode composite material on the other main surface (for example, the lower surface) of the positive electrode substrate 211A. As a result, the positive electrode 21 formed by the positive electrode substrate 211 is obtained.

Second, the negative electrode 23 is then prepared. The negative electrode composite material layer 231B is formed by applying and drying the resin composition for forming the negative electrode composite material layer as the composition for forming the electrode composite material on one of the main surfaces (for example, the upper surface) of the negative electrode substrate 231A. Similarly, the negative electrode composite material layer 231B is formed by applying and heating the resin composition for forming the negative electrode composite material layer on the other main surface (for example, the lower surface) of the negative electrode substrate 231A. This results in the negative electrode substrate 231.

The isolation layer 232 is then formed by applying and drying the liquid composition for the electrode of the present embodiment on one of the main (for example, upper surface) surfaces of the negative electrode substrate 231. Similarly, the isolation layer 232 is formed by applying and heating the liquid composition for the electrode of the present embodiment on the other main (for example, lower surface) surface of the negative electrode substrate 231. As a result, the negative electrode 23 in which the isolation layer 232 is formed on both the upper and lower surfaces of the negative electrode substrate 231 is obtained.

Then, the separator 22 is disposed on both the upper and lower surfaces of the negative electrode 23. On the upper surface side of the negative electrode 23, the positive electrode 21 and the negative electrode 23 are alternately laminated through the separator 22 so that the topmost layer is the negative electrode 23. Accordingly, the electrochemical device 100 is obtained.

The electrochemical device 100 includes the positive electrode 21, the separator 22, and the negative electrode 23. The negative electrode 23 is formed using the electrode of the embodiments described above and includes the isolation layer 232 on both sides of the negative electrode substrate 231. As the isolation layer 232 is provided in contact with the separator 22, the negative electrode 23 can have excellent adhesion to the separator 22. Thus, the electrochemical device 100 is capable of exerting excellent charge and discharge characteristics.

The electrochemical device 100 also has the isolation layer 232 on the negative electrode 23, thus providing high strength against puncturing and high safety against puncturing.

The charge and discharge characteristics of the electrochemical device 100 can be evaluated in terms of the input and output characteristics and the capacity after the cycle test.

<I/O Characteristics>

In determining the I/O characteristics of the electrochemical device 100, the initial capacity of the electrochemical device 100 is first determined. The initial capacity of the electrochemical device 100 is, for example, charged to a cut-off voltage (for example, 4.2 V) at a predetermined current rate (for example, 0.2 C) as a CCCV mode (a mode in which constant current charging is performed until partway and a constant voltage charging is switched from partway) under a 25° C. environment by connecting the electrode for charging and discharging to the positive electrode drawer 211A-1 and the negative electrode drawer 231A-1A. Thereafter, as a CC mode (constant current mode), a constant current discharge is performed to a cut-off voltage (for example, 2.5 V) at a predetermined current rate (for example, 0.2 C). This is repeated twice as one cycle, and the second discharge capacity is determined as an actual 100% capacity of the electrochemical device 100. In the second discharge capacity, the initial capacity [mAh] is calculated from the time and the current value of the time when the electrochemical device is discharged at constant current until the cut-off voltage (for example, 2.5 V) is reached in the second cycle.

A charge and discharge test of the electrochemical device 100 is then performed to calculate the I/O characteristics of the electrochemical device 100. For example, the electrochemical device is charged at constant current as a CCCV mode to a cut-off voltage (for example, 4.2 V) at a predetermined current rate (for example, 0.2 C) under a 25° C. environment. Thereafter, the electrochemical device is charged for a predetermined period of time (for example, 10 hours) at a current value of a constant voltage (for example, 4.2 V) and is fully charged. Thereafter, as the CC mode (constant current mode), the electrochemical device is discharged at constant current at a predetermined current rate (for example, 0.1 C) for a predetermined period of time (for example, 1 hour), and then discharged while adjusting the state of charge (SOC). Specifically, constant current discharging is performed such that the state of charge is reduced by 10% in a predetermined period of time (for example, 1 hour) until the state of charge reaches 90% to 10%. Then, after a pause of a predetermined time (for example, 10 minutes), charge and discharge are performed at current rates of 0.2 C, 1.0 C, 2.0 C, and 5.0 C in this order for 10 seconds each. After a pause of a predetermined time (for example, 10 minutes), the electrochemical device is then discharged by adjusting the SOC in the same manner as described above. The input/output characteristics are evaluated by comparing the capacity at 50% SOC at this time with the capacity at 50% SOC when a previously obtained reference electrochemical element is used. The reference electrochemical device refers to a conventional electrochemical device in which the negative electrode does not have the isolation layer according to the present embodiment.

<Capacity after Cycle Test>

The capacity of the electrochemical device 100 after cycle test can be evaluated by the capacity of the electrochemical device 100 after multiple (for example, 1,000 cycles) charging and discharging. Specifically, the electrochemical device is charged at constant current as a CCCV mode to a cut-off voltage (for example, 4.2 V) at a predetermined current rate (for example, 0.2 C) under a 25° C. environment, and the electrochemical device is paused for a predetermined time (for example, 10 minutes). Thereafter, as the CC mode, the electrochemical device is discharged at constant current at a predetermined current rate (for example, 2.0 C), and the electrochemical device is paused for a predetermined time (for example, 10 minutes). The above process is counted as one cycle, and multiple times have repeated (for example, 99 cycles).

Thereafter, a predetermined number of cycles (for example, 100 cycles) of charging and discharging is performed. At this time, the charge and discharge may be performed under the following conditions. In CCCV mode, the electrochemical device is charged at constant current at a predetermined current rate (for example, 0.2 C) to a cut-off voltage (for example, 4.2 V) and then paused for a predetermined period (for example, 10 minutes). Thereafter, as the CC mode, the electrochemical device is discharged at constant current at a predetermined current rate (for example, 0.2 C) to a cut-off voltage (for example, 2.5 V) and then paused for a predetermined period (for example, 10 minutes).

The predetermined (for example, 100 cycles) charge and discharge are repeated multiple times (for example, 10 times). Then, the predetermined charge and discharge (for example 1,000 cycles) are carried out, and the capacity of the electrochemical device 100 at the $1000^{th}$ cycle is measured. The capacity at this time is evaluated by comparing the capacity of the electrochemical device when charged and discharged multiple times under the same conditions with the reference electrochemical device described above.

<Safety Test of Electrochemical Device by Puncturing>

The safety of the electrochemical device by puncturing the electrochemical device 100 can be evaluated as follows. The electrode device 20 is disposed within the outer case 40 and injected with the electrolyte 30, followed by being left as is for a predetermined period of time (12 hours). Thereafter, as a CCCV mode, the electrochemical device 100 is initially charged at constant current at a predetermined current rate (for example, 0.2 C) to a cut-off voltage (for example, 4.2 V) under a 25° C. environment. Then, the electrochemical device is charged at a constant voltage (CV) for a predetermined period of time, and allowed to stand at 25° C. for a predetermined period of time. Thereafter, charging is stopped at 25° C. for a predetermined period of time. The electrochemical device is then charged at a predetermined current rate (for example, 0.2 C), as a CCCV mode, up to a cut-off voltage (for example, 4.2 V). Then, the electrochemical device is discharged at a constant current at a predetermined current rate (for example, 0.2 C), as a CC mode, up to the cut-off voltage (for example, 2.5 V), and the electrochemical device is charged at CV. Then, the center of the fully charged electrode device is punctured with a nail having a predetermined diameter (for example, φ 4.5 mm) to check the voltage, temperature, smoking, ignition, and the like, and to evaluate the safety of the electrochemical device 100.

<Evaluation of Adhesion>

After the charging and discharging of the electrochemical device 100 is completed, the electrochemical device is disassembled in a CC mode with a constant current discharge to a cut-off voltage (for example, 2.5 V) at a predetermined current rate (for example, 0.2 C). Then, the separator 22 of the electrode device 20 included in the electrochemical device 100 is peeled off from the positive electrode 21 and the negative electrode 23. Then, after the separator 22 is peeled off, the negative electrode 23 is washed several times (for example, three times) with dimethyl carbonate (DMC). At this time, a new DMC may be used for washing. After washing, naturally drying for several days (for example, more than three days) at room temperature and general environment. Then, the peel strength (unit: N) of the isolation layer 232 provided on the surface of the aforementioned disassembled negative electrode 23 is measured in accordance with JIS-K6854-1 using a peel tester (VERSATILE PEEL ANALYZER VPA-3S, manufactured by Kyowa Interface Science, Inc.). By dividing the peel strength by the width of the scotch tape (cellophane tape) used for the measurement (for example, 0.018 m), the adhesion (unit: N/m) of the isolation layer 232 can be calculated.

The use of electrochemical devices is not particularly limited because of their properties as described above. The electrochemical devices can suitably be used as a power source, for example, notebook PCs, pen input PCs, mobile PCs, electronic book players, mobile phones, portable faxes, portable copies, portable printers, headphone stereos, video movies, liquid crystal televisions, handy cleaners, portable CDs, mini disks, transceivers, electronic pocketbooks, electronic calculators, memory cards, portable tape recorders, radios, backup power supplies, motors, lighting fixtures, toys, game machines, clocks, stroboscopes, cameras, and the like.

EXAMPLE

Hereinafter, although Examples and Comparative Examples are indicated and described in further detail, embodiments are not limited by these Examples and Comparative Examples.

Example 1

Preparation of Liquid Compositions for Electrodes

The dispersion liquid was obtained by mixing 51.7% by mass of the inorganic particles (AKP-3000, manufactured by Sumitomo Chemical Co., Ltd.), 2.6% by mass of the dispersant (Mariarim (registered trademark), SC-1015F, manufactured by NOF Corporation), and 45.7% by mass of the solvent (diacetone alcohol, manufactured by Sankyo Chemical Co., Ltd.), using a disperser (lab star mini LMZ015, manufactured by Ashizawa Co., Ltd.). Thereafter, a liquid obtained by mixing a polymer polycarboxylic acid ammonium salt (HKM-150A, manufactured by NOF Corporation) as a resin and an additive solvent (diacetone alcohol, Sankyo Chemical Co., Ltd.) was added dropwise to the dispersion liquid while stirring, and a liquid composition for an electrode having a particle concentration of 40% was prepared.

(Solubility of Resin)

((Solubility in Non-Polar Solvents))

The resin used was immersed in a non-polar solvent solution of dimethyl carbonate (DMC) or a solution of methyl ethyl carbonate (EMC) under 1 atm at 25° C. The resin was dissolved in both solutions.

((Solubility in Non-Aqueous Electrolytic Solution))

A non-aqueous electrolytic solution containing DMC and EMC was prepared as a mixture of non-polar solvents. When the resin used was immersed in a non-aqueous electrolytic solution which was a mixture of non-polar solvents, the resin dissolved in the same way as the solution of the non-polar solvent. As for the non-aqueous electrolytic solution, a mixed solution prepared by the [preparation of Non-Aqueous Electrolytic Solution] described later was used as the non-aqueous electrolytic solution.

Table 1 indicates the results of the evaluation of the solubility of resins in the non-polar solvent or non-aqueous electrolytic solution under 1 atm at 25° C. In Table 1, when the resin was dissolved in the non-polar solvent or non-aqueous electrolytic solution, it was determined as “a”. When the resin was not dissolved in the non-polar solvent or non-aqueous electrolytic solution, it was determined as “b”.

(Viscosity of Liquid Composition for Electrode)

The viscosity of the liquid composition for electrode was measured to determine if the liquid composition was formed as a low viscosity liquid composition for the electrode. The viscosity of the liquid composition for the electrode was measured using a TV 25-type viscometer TV-25 (manufactured by Toko Sangyo Co., Ltd.). The viscosity of the liquid composition for the electrode was 30 mPa·sec. or less. When the viscosity was 30 mPa·sec. or less, the liquid composition was considered to be a low viscosity liquid composition for the electrode.

Preparation of Negative Electrode

The negative electrode active material (carbon, SCMG-XRs, manufactured by Showa Denko K.K.) was additionally mixed with a resin for forming a layer of the negative electrode composite material layer (AZ-9129, manufactured by ZEON Japan) and a thickener (carboxymethylcellulose (H01496B) HS-6, manufactured by Daiichi Industrial Pharmaceutical Co., Ltd.). Subsequently, the mixture was double-filtered with 10 μm and 5 μm. Then, the mixture was applied on both sides of the negative electrode substrate (copper foil) with an ink jet printer (EV 2500, manufactured by Ricoh Co., Ltd.) and dried with a heater to form the negative electrode composite material layer. Accordingly, the negative electrode substrate having a negative electrode active material formed on the negative electrode substrate was prepared.

At this time, the reflectivity of the negative electrode substrate was measured using RM200 (manufactured by X-Rite Inc.) to measure the chromaticity with use of the value L* in the range of 40 to 48, which is the value corresponding to the evaluation value of black and white. When the value of L* is large, the color is white, and when the value of L* is small, the color is black.

The liquid composition for the electrode prepared by [Preparation of Liquid Composition for Electrode] described above was then coated with an ink jet printer (EV2500, manufactured by Ricoh Co., Ltd.) with an uncoated area on the main surface of the negative electrode substrate and dried on a hot plate to form the isolation layer. Then, a part of the uncoated area was left and the electrode drawer (see FIG. 2) was cut out so as to be formed. This allowed to form the negative electrode.

Preparation of Positive Electrode

A conductive material (Ketchen Black 600JD, manufactured by Denka Company Limited) and a resin for forming a positive electrode composite material layer (PVDF 5130, manufactured by Solvay) were additionally mixed into a lithium-nickel-cobalt aluminum composite oxide (NCA). Then, the mixture was coated on both sides of the positive electrode substrate (aluminum foil) using a coating machine, and dried with a heater to form a positive electrode composite material layer. The positive electrode substrate, in which the positive active material was formed on the positive electrode substrate, was formed.

The liquid composition for the electrode prepared by [Preparation of Liquid Composition for Electrode] described above was then coated with an ink jet printer (EV2500, manufactured by Ricoh Co., Ltd.) with an uncoated area, and dried with a hot plate to form the isolation layer. Thereafter, the uncoated area was left and the electrode drawer (see FIG. 2) was cut out so as to be formed. This allowed to form the positive electrode.

Preparation of Separator

The resin film (F20BHE, manufactured by Sekisui Chemical Co., Ltd.) was punched into the predetermined shape to produce a separator.

Preparation of Non-Aqueous Electrolytic Solution 1.5% by weight of vinylene carbonate (VC) as an additive agent was added to the non-aqueous solvent mixture of dimethyl carbonate (DMC), ethylene carbonate (EC), and ethyl methyl carbonate (EMC)=1:1:1. 1.5 mol/L of lithium hexafluorophosphate ($LiPF_6$, manufactured by Kanto Denka Kogyo Co., Ltd.) as an electrolyte salt was additionally added to the mixture so that 1.5 mol/L in the mixture is attained. The mixture solution was used as the electrolytic solution.

Preparation of Lithium-Ion Secondary Battery

A positive electrode and a negative electrode were alternately laminated through a separator without overlapping a positive electrode drawer wiring and a negative electrode drawer wiring to obtain an electrode device. The positive and negative electrodes are laminated so that the capacity of the positive and negative electrodes of the electrode device to be 180 mAh. At this time, the negative electrode was laminated one more than the positive electrode so that the electrodes of the both ends of the electrode device became negative electrode. Then, a part of copper foil, which is a substrate for the negative electrode, and a part of aluminum foil, which is a substrate for the positive electrode, were placed in a sealing container (casing) in which a non-aqueous electrolyte was injected, and sealed by heat pressure bonding or the like to obtain a lithium-ion secondary battery. The positive electrode drawer and the negative electrode drawer were bonded with a crimp-type terminal.

As a reference, a reference lithium-ion secondary battery that includes the negative electrodes without the isolation layers of the present embodiment was prepared.

<Evaluation of Battery>

An initial capacity of the lithium-ion secondary battery, a capacity after 1000 cycles, and a safety test of the lithium-ion secondary battery by puncturing the battery were evaluated. In addition, the adhesion of the negative electrode after 1000 cycles of lithium-ion secondary battery was evaluated.

Initial Capacity of Li-Ion Secondary Battery

A charge and discharge test was performed to evaluate the initial capacity of the lithium-ion secondary battery. Specifically, the electrodes for charging and discharging and the electrodes are drawn around the terminals of the drawer of the positive and negative electrodes. The lithium-ion secondary battery was charged at a current rate of 0.2 C, as a CCCV mode (a mode in which a constant current charging is performed until partway and a constant voltage charging is switched from partway), to a cut-off voltage of 4.2 V under a 25° C. environment. Then, the lithium-ion secondary battery was discharged at a constant current at a current rate of 0.2 C, as a CC mode (constant current mode), to a cut-off voltage of 2.5 V. The above process was counted as one cycle, and repeated twice. The discharge capacity at the second time was determined as the actual 100% capacity of the lithium-ion secondary battery. In the second discharge capacity, the initial capacity [mAh] was calculated from the time and the current value of the time when the lithium-ion secondary battery is discharged at constant current until the cut-off voltage of 2.5 V is reached in the second cycle.

I/O Measurement

A charge and discharge test of the lithium-ion secondary battery was performed to calculate the I/O characteristics of the lithium-ion secondary battery. For example, the lithium-ion secondary battery was charged at constant current at a predetermined current rate of 0.2 C, as a CCCV mode, to a cut-off voltage of 4.2 V under a 25° C. environment. Thereafter, the lithium-ion secondary battery was charged for 10 hours at a current value of a constant voltage of 4.2 V and is fully charged. Thereafter, as a CC mode (constant current mode), the lithium-ion secondary battery was discharged at constant current at a predetermined current rate of 0.1 C for 1 hour, and then discharged while adjusting the state of charge (SOC). Specifically, constant current discharging was performed such that the state of charge is reduced by 10% in 1 hour until the state of charge reaches 90% to 10%. Specifically, constant current discharge was performed so that the state of charge drops to 90% in the first hour. Constant current discharge was then performed so that the state of charge drops to 80% over the next hour. Constant current discharge was then performed so that the state of charge drops to 70% over the next hour. The aforementioned process was repeated, and finally constant current discharge was performed so that the state of charge drops to 10% in one hour. Then, after a pause of 10 minutes, the charge and discharge were performed at current rates of 0.2 C, 1.0 C, 2.0 C, and 5.0 C in this order for 10 seconds each. After a pause of 10 minutes, the lithium-ion secondary battery was then discharged by adjusting the SOC in the same manner as described above. The input/output characteristics were evaluated by comparing the capacity at 50% SOC at this time with the capacity at 50% SOC when a previously obtained reference lithium-ion secondary battery was used in accordance with the following criteria.

a: The ratio of the capacity at 50% SOC to the capacity at 50% SOC using the reference lithium-ion secondary battery was 95% or higher.

b: The ratio of the capacity at 50% SOC to the capacity at 50% SOC using the reference lithium-ion secondary battery was lower than 95%.

Capacity after 1,000 Cycles

The capacity of the lithium-ion secondary battery was evaluated after the charge and discharge was performed for 1,000 cycles. Specifically, the lithium-ion secondary battery was charged at constant current at a current rate of 1.0 C, as a CC mode, to a cut-off voltage of 4.2 V under a 25° C. environment, followed by pausing for 10 minutes. Thereafter, as a CC mode, the lithium-ion secondary battery was discharged at a constant current at a current rate of 2.0 C to a cut-off voltage of 2.5 V, followed by pausing for 10 minutes. The above process was counted as one cycle, and repeated for 99 more cycles.

Thereafter, the 1I0 cycle of charge and discharge was carried out under the following conditions. That is, the lithium-ion secondary battery was charged at a constant current at a current rate of 0.2 C, as a CCCV mode, to a cut-off voltage of 4.2 V, followed by pausing for 10 minutes. Then, as a CC mode, the lithium-ion secondary battery was discharged at constant current at a current rate of 0.2 C to a cut-off voltage of 2.5 V, followed by pausing for 10 minutes.

The 100 cycles of charge and discharge described above were repeated 10 times for 1000 cycles, and the capacity of the $1000^{th}$ cycle of the lithium-ion secondary battery was measured. The capacity at this time was compared with the capacity of the lithium-ion secondary battery when the reference lithium-ion secondary battery was charged and discharged for 1000 cycles in the same manner, and was evaluated based on the following evaluation criteria.

a: The ratio of the capacity of the lithium-ion secondary battery at 1000 cycles to the capacity of the reference lithium-ion secondary battery at 1000 cycles was 80% or higher.

b: The ratio of the capacity of the lithium-ion secondary battery at 1000 cycles to the capacity of the reference lithium-ion secondary battery at 1000 cycles was lower than 80%.

Safety Test of Lithium-Ion Secondary Battery by Puncturing Battery

In the above-described [Preparation of Lithium-Ion Secondary Battery], the positive electrode and the negative electrode constituting the electrode device were laminated so that the capacity was 1,300 mAh, and the electrode device was prepared. A lithium-ion secondary battery including the obtained electrode device was prepared, and the safety of the lithium-ion secondary battery by puncturing the battery with a nail was evaluated. The safety of the lithium-ion secondary battery by puncturing the battery with a nail was performed by arranging the electrode device within the sealed container, and the non-aqueous electric solution was injected to the container, followed by being left to stand for 2 hours. Thereafter, the lithium-ion secondary battery was initially charged at constant current at a constant rate of 0.2 C, as a CCCV mode, to a cut-off voltage of 4.2 V under a 25° C. environment. Then, the lithium-ion secondary battery was charged at constant voltage (CV) for 5 hours, followed by being left for a predetermined amount of time under a 25° C. environment. Thereafter, the lithium-ion secondary battery was left as is for 5 days under a 25° C. environment. The lithium-ion secondary battery was charged at a current rate of 0.2 C as a CCCV mode to a cut-off voltage of 4.2 V. The lithium-ion secondary battery was then discharged at a constant current at a current rate of 0.2 C as a CC mode to a cut-off voltage of 2.5 V. Then, the lithium-ion secondary battery was charged at a current rate of 0.2 C as a CCCV mode to a cut-off voltage of 4.2 V, followed by charging at constant voltage for 5 hours. Thereafter, the center of the fully charged electrode device was punctured with a nail having a diameter of 4.5 mm to observe the voltage and temperature of the battery, and the occurrence of smoke and ignition of the battery. The safety of the lithium-ion secondary battery was evaluated in accordance with the following evaluation criteria.

(Evaluation Criteria)

a: A very small amount of smoke, or no smoke and no ignition was observed.

b: A large amount of smoke or ignition was observed.

(Evaluation Criteria)

a: A very small amount of smoke, or no smoke and no ignition was observed.

b: A large amount of smoke or ignition was observed.

Evaluation of Adhesion (Disassembly of Electrode Device)

After the lithium-ion secondary batter was charged and discharged, the lithium-ion secondary battery was charged at constant current at a current rate 0.2 C, as a CC mode, to a cut-off voltage of 2.5 V. Thereafter, the lithium-ion secondary battery was disassembled. Specifically, the sealing container and the electrode were cut off and disassembled. Next, the positive and negative electrodes on the three sides other than the drawer wiring portion of the sealing container were cut so as not to disassemble. The root of the crimped drawer wiring was then cut off, and the separator, the positive electrode, and the negative electrode were peeled off one by one. Then, the electrode formed with the isolation layer on the electrode composite material layer after peeling was washed three times with dimethyl carbonate (DMC). Of the three washes, the last two were washed with fresh DMC. After washing, the electrodes were dried naturally in a draft chamber at room temperature under general conditions for 3 days or more.

(Measurement of Adhesion Strength)

A peel tester (VERSATILE PEEL ANALYZER VPA-3S, manufactured by Kyowa Interface Science Co., Ltd.) was used to measure the peel strength (unit: N) of the isolation layer on the aforementioned disassembled negative electrode composite material layer in accordance with JIS-K6854-1. The adhesion strength (unit: N/m) was calculated by dividing the peel strength by the 18 mm (0.018 m) width of the scotch tape (cellophane tape) (manufactured by Nitto Denko Corporation) which was used for the peel strength measurement. The results were evaluated based on the following evaluation criteria.

(Evaluation Criteria)

a: The adhesion was 30 N/m or more.

b: The adhesion was less than 30 N/m.

Table 1 indicates the evaluation results of the initial capacity of the lithium-ion secondary battery, the capacity after 1000 cycles, the safety of the lithium-ion secondary battery by puncturing with a nail, and the adhesion of the negative electrode after 1000 cycles.

Examples 2 to 5

Examples 2 to 5 were performed in the same manner as Example 1, except that polymeric polycarboxylic acid ammonium salt 1 as a resin indicated in [Preparation of Liquid Composition for Electrode] was changed to polyethylene glycols 1 to 4 as resins as indicated in Table 1. The product names and manufacturers of polyethylene glycols 1 to 4 are indicated below.

Polyethylene glycol 1: PEG200, Kanto Chemical Co., Ltd.

Polyethylene glycol 2: PEG400, Kanto Chemical Co., Ltd.

Polyethylene glycol 3: PEG1540, Kanto Chemical Co., Ltd.

Polyethylene glycol 4: PEG4000, Kanto Chemical Co., Ltd.

Examples 6 to 23

Examples 6 to 23 were performed in the same manner as Example 1, except that polymeric polycarboxylic acid ammonium salt 1 as a resin indicated in [Preparation of Liquid Composition for Electrode] was changed to polyoxyethylene polyoxypropyrene glycols 1 to 16 as resins as indicated in Tables 1 and 2. The product names and manufacturers of polyoxyethylene polyoxypropyrene glycols 1 to 16 are indicated below.

Polyoxyethylene polyoxypropylene glycol 1: Epan 450, manufactured by Daiichi Kogyo Pharmaceutical Co., Ltd.

Polyoxyethylene polyoxypropylene glycol 2: Epan 710, manufactured by Daiichi Kogyo Pharmaceutical Co., Ltd.

Polyoxyethylene polyoxypropylene glycol 3: Epan 720, manufactured by Daiichi Kogyo Pharmaceutical Co., Ltd.

Polyoxyethylene polyoxypropylene glycol 4: Epan 740, manufactured by Daiichi Kogyo Pharmaceutical Co., Ltd.

Polyoxyethylene polyoxypropylene glycol 5: Epan 750, manufactured by Daiichi Kogyo Pharmaceutical Co., Ltd.

Polyoxyethylene polyoxypropylene glycol 6: Epan U-105, manufactured by Daiichi Kogyo Pharmaceutical Co., Ltd.

Polyoxyethylene polyoxypropylene glycol 7: Pluronic (Registered Trademark) P84, manufactured by ADEKA Corporation.

Polyoxyethylene polyoxypropylene glycol 8: Pluronic (Registered Trademark) L44, manufactured by ADEKA Corporation.

Polyoxyethylene polyoxypropylene glycol 9: Newpol PE-64, manufactured by Sanyo Chemical, Ltd.

Polyoxyethylene polyoxypropylene glycol 10: Newpol PE-74, manufactured by Sanyo Chemical, Ltd.

Polyoxyethylene polyoxypropylene glycol 11: Newpol PE-75, manufactured by Sanyo Chemical, Ltd.

Polyoxyethylene polyoxypropylene glycol 12: Pluronic F-68, manufactured by ALD.

Polyoxyethylene polyoxypropylene glycol 13: Pluronic L-121, manufactured by ALD.

Polyoxyethylene polyoxypropylene glycol 14: Pluronic L-64, manufactured by ALD.

Polyoxyethylene polyoxypropylene glycol 15: PLONON #104, manufactured by NOF Corporation.

Polyoxyethylene polyoxypropylene glycol 16: PLONON #201, manufactured by NOF Corporation.

Polyoxyethylene polyoxypropylene glycol 17: PLONON #202B, manufactured by NOF Corporation.

Polyoxyethylene polyoxypropylene glycol 18: PLONON #204, NOF Corporation.

Examples 24 to 27

Examples 24 to 27 were performed in the same manner as Example 1, except that polymeric polycarboxylic acid ammonium salt 1 as a resin indicated in [Preparation of Liquid Composition for Electrode] was changed to lauryl alcohol ethoxylate, oleyl alcohol ethoxylate, primary alcohol ethoxylate, and modified silicone, respectively, as resins as indicated in Tables 1 and 2. The product names and manufacturers of lauryl alcohol ethoxylate, oleyl alcohol ethoxylate, primary alcohol ethoxylate, and modified silicone are indicated below.

Lauryl alcohol ethoxylate: Adekatol LA-775, manufactured by ADEKA Corporation.

Oleyl alcohol ethoxylate: Adekatol TN-80, manufactured by ADEKA Corporation.

Primary alcohol ethoxylate: Adekatol LO-7, manufactured by ADEKA Corporation.

Modified silicone: DBE-C25, manufactured by Gelest Inc.

Comparative Example 1

Comparative Example 1 was performed in the same manner as Example 1, except that Comparative Example 1 did not use a resin in the [Preparation of liquid composition for electrode].

Comparative Examples 2 to 8

Comparative Examples 2 to 8 were performed in the same manner as Example 1, except that polymeric polycarboxylic acid ammonium salt 1 as a resin indicated in [Preparation of Liquid Composition for Electrode] was changed to polymeric polycarboxylic acid ammonium salt 2, polypropylene glycols 1 to 4, polyethylene glycol 5, and SBR particles, respectively, as indicated in Table 3. The product names and manufacturers of polymeric polycarboxylic acid ammonium salt 2, polypropylene glycols 1 to 4, polyethylene glycol 5, and SBR particles are indicated below.

Polymeric polycarboxylic acid ammonium salt 2: HKM-50A, manufactured by NOF Corporation.

Polypropylene glycol 1: PPG400, manufactured by FUJIFILM Wako Pure Chemical Corporation.

Polypropylene glycol 2: PPG1000, manufactured by FUJIFILM Wako Pure Chemical Corporation.

Polypropylene glycol 3: PPG3000, manufactured by FUJIFILM Wako Pure Chemical Corporation.

Polypropylene glycol 4: PPG4000, manufactured by Fujifilm Wako Pure Chemical Corporation.

Polyethylene glycol 5: PEG6000, manufactured by Tokyo Chemical Industries Co., Ltd.

SBR particles: SBR particles, TRD-104A

It should be noted that neither the polymeric polycarboxylic acid ammonium salt 2, which was the resin used in Comparative Example 2, nor the polyethylene glycol 5, which was the resin used in Comparative Example 7, was dissolved in the dimethyl carbonate. Therefore, it was confirmed that the liquid composition for the electrode used in Comparative Examples 2 and 7 has a viscosity higher than 30 mPa·sec. and is not feasible as the liquid composition for the electrode. Therefore, the lithium-ion secondary battery could not be prepared using the liquid composition for the electrodes used in Comparative Examples 2 and 7. Accordingly, the battery characteristics and the adhesion to the negative electrode were not measured, and the evaluation of these were not obtained.

Table 1 indicates the evaluation results of types of resin contained in the liquid composition for the electrodes, the presence or absence of EO chains, the solubility in the non-polar solvent, the solubility in the non-aqueous electrolytic solution, and the feasibility as the low viscosity liquid composition, the battery characteristics of the lithium-ion secondary battery, and adhesion to the separator after 1000 cycles of the negative electrode.

TABLE 1

| | Liquid composition for electrode | | | | | | Lithium ion secondary battery | | | |
|---|---|---|---|---|---|---|---|---|---|---|
| | Resin | | | | | | Battery characteristics | | | Negative |
| | | | Non-polar solvents | | Mixture solution | Feasibility | | | Safety test of | Electrode Adhesion to |
| | Type | EO chain | Solubility in DMC | Solubility in EMC | Solubility in non-aqueous electric solution | as a low viscosity liquid composition | I/O measurement | Capacity after 1000 cycles | lithium ion secondary battery by puncturing | separator after 1000 cycles |
| Example 1 | Polymeric polycarboxylic acid ammonium salt 1 | Present | a | a | a | a | a | a | a | a |
| Example 2 | Polyethylene glycol 1 | Present | a | a | a | a | a | a | a | a |
| Example 3 | Polyethylene glycol 2 | Present | a | a | a | a | a | a | a | a |
| Example 4 | Polyethylene glycol 3 | Present | a | a | a | a | a | a | a | a |
| Example 5 | Polyethylene glycol 4 | Present | a | a | a | a | a | a | a | a |
| Example 6 | Polyoxyethylene polyoxypropylene glycol 1 | Present | a | a | a | a | a | a | a | a |
| Example 7 | Polyoxyethylene polyoxypropylene glycol 2 | Present | a | a | a | a | a | a | a | a |
| Example 8 | Polyoxyethylene polyoxypropylene glycol 3 | Present | a | a | a | a | a | a | a | a |
| Example 9 | Polyoxyethylene polyoxypropylene glycol 4 | Present | a | a | a | a | a | a | a | a |
| Example 10 | Polyoxyethylene polyoxypropylene glycol 5 | Present | a | a | a | a | a | a | a | a |
| Example 11 | Polyoxyethylene polyoxypropylene glycol 6 | Present | a | a | a | a | a | a | a | a |
| Example 12 | Polyoxyethylene polyoxypropylene glycol 7 | Present | a | a | a | a | a | a | a | a |
| Example 13 | Polyoxyethylene polyoxypropylene glycol 8 | Present | a | a | a | a | a | a | a | a |
| Example 14 | Polyoxyethylene polyoxypropylene glycol 9 | Present | a | a | a | a | a | a | a | a |
| Example 15 | Polyoxyethylene polyoxypropylene glycol 10 | Present | a | a | a | a | a | a | a | a |

TABLE 2

| | Liquid composition for electrode | | | | | | Lithium ion secondary battery | | | |
|---|---|---|---|---|---|---|---|---|---|---|
| | Resin | | | | | | Battery characteristics | | | Negative |
| | | | Non-polar solvents | | Mixture solution | Feasibility | | | Safety test of | Electrode Adhesion to |
| | Type | EO chain | Solubility in DMC | Solubility in EMC | Solubility in non-aqueous electric solution | as a low viscosity liquid composition | I/O measurement | Capacity after 1000 cycles | lithium ion secondary battery by puncturing | separator after 1000 cycles |
| Example 16 | Polyoxyethylene polyoxypropylene glycol 11 | Present | a | a | a | a | a | a | a | a |
| Example 17 | Polyoxyethylene polyoxypropylene glycol 12 | Present | a | a | a | a | a | a | a | a |
| Example 18 | Polyoxyethylene polyoxypropylene glycol 13 | Present | a | a | a | a | a | a | a | a |
| Example 19 | Polyoxyethylene polyoxypropylene glycol 14 | Present | a | a | a | a | a | a | a | a |

TABLE 2-continued

| | Liquid composition for electrode: Resin: Type | EO chain | Non-polar solvents: Solubility in DMC | Non-polar solvents: Solubility in EMC | Mixture solution: Solubility in non-aqueous electric solution | Feasibility as a low viscosity liquid composition | Lithium ion secondary battery: Battery characteristics: I/O measurement | Capacity after 1000 cycles | Safety test of lithium ion secondary battery by puncturing | Negative Electrode Adhesion to separator after 1000 cycles |
|---|---|---|---|---|---|---|---|---|---|---|
| Example 20 | Polyoxyethylene polyoxypropylene glycol 15 | Present | a | a | a | a | a | a | a | a |
| Example 21 | Polyoxyethylene polyoxypropylene glycol 16 | Present | a | a | a | a | a | a | a | a |
| Example 22 | Polyoxyethylene polyoxypropylene glycol 17 | Present | a | a | a | a | a | a | a | a |
| Example 23 | Polyoxyethylene polyoxypropylene glycol 18 | Present | a | a | a | a | a | a | a | a |
| Example 24 | Lauryl alcohol ethoxylate | Present | a | a | a | a | a | a | a | a |
| Example 25 | Oleyl alcohol ethoxylate | Present | a | a | a | a | a | a | a | a |
| Example 26 | Primary alcohol ethoxylate | Present | a | a | a | a | a | a | a | a |
| Example 27 | Modified silicone | Present | a | a | a | a | a | a | a | a |

TABLE 3

| | Liquid composition for electrode: Resin: Type | EO chain | Non-polar solvents: Solubility in DMC | Non-polar solvents: Solubility in EMC | Mixture solution: Solubility in non-aqueous electric solution | Feasibility as a low viscosity liquid composition | Lithium ion secondary battery: Battery characteristics: I/O measurement | Capacity after 1000 cycles | Safety test of lithium ion secondary battery by puncturing | Negative Electrode Adhesion to separator after 1000 cycles |
|---|---|---|---|---|---|---|---|---|---|---|
| Comparative Example 1 | — | — | — | — | — | a | a | a | b | — |
| Comparative Example 2 | Polymeric polycarboxylic acid ammonium salt 2 | Present | a | b | b | b | — | — | — | b |
| Comparative Example 3 | Polypropylene glycol 1 | Absent | a | a | a | a | a | a | b | b |
| Comparative Example 4 | Polypropylene glycol 2 | Absent | a | a | a | a | a | a | b | b |
| Comparative Example 5 | Polypropylene glycol 3 | Absent | a | a | a | a | a | a | b | b |
| Comparative Example 6 | Polypropylene glycol 4 | Absent | a | a | a | a | a | a | b | — |
| Comparative Example 7 | Polyethylene glycol 5 | Present | b | b | b | b | — | — | — | a |
| Comparative Example 8 | SBR particles | Absent | b | b | b | a | b | b | b | b |

From Tables 1 and 2, in Examples 1 to 27, the input/output and capacity of the lithium-ion secondary batteries after 100 cycle were in practically acceptable levels, and the safety test of lithium-ion secondary batteries by puncturing batteries showed favorable results. In addition, no peelings were observed in the isolation layers of the negative electrodes after 1000 cycles, and the film surfaces of the isolation layers had an adhesion of 30 N/m or more, and the adhesion of the negative electrodes showed favorable results.

From Table 3, in Comparative Examples 1, and 3 to 6, the safety test of lithium-ion secondary batteries by puncturing batteries showed a large amount of smoke or ignition was observed, showing unfavorable results. In addition, peeling occurred in the isolation layers of the negative electrodes after 1000 cycles, and the adhesion of the film surfaces of the isolation layers could not be measured.

From Table 3, in Comparative Examples 2 and 7, the resins were not dissolved in any of the non-polar solvents such as dimethyl carbonate or ethyl methyl carbonate, and electrolytic solution, and the viscosity of the liquid composition for the electrodes was higher than 30 mPa·sec.

From Table 3, in Comparative Example 8, the resin was not dissolved in any of the non-polar solvents such as dimethyl carbonate, ethyl methyl carbonate, and the electrolytic solution, and the viscosity of the liquid composition for the electrode was 30 mPa·sec. or less. Input/output and the capacity of lithium-ion secondary battery after 1000 cycles were at level that were problematic for practical use, and the safety test of lithium-ion secondary battery by puncturing the battery showed unfavorable result. This is considered to be due to the poor ionic conductivity since the SBR particles of Comparative Example 8 did not dissolve in a mixture containing the electrolyte non-polar solvent as compared to Examples 1 to 26.

Therefore, unlike the lithium-ion secondary batteries of Comparative Examples 1 to 8, the lithium-ion secondary batteries of Examples 1 to 27 are high-quality liquid compositions for the electrodes that can have excellent adhesion to the electrode composite material layers by providing the predetermined isolation layers on the negative electrodes, and can exert excellent battery characteristics.

Although the embodiments have been described as above, the embodiments are presented by way of example and the invention is not limited by the embodiments. The embodiments may be implemented in various other forms, and various combinations, omissions, substitutions, modifications, or the like may be made without departing from the spirit of the invention. These embodiments and modifications thereof are included in the scope and gist of the invention and are included in the scope of the invention and equivalents thereto.

This international application claims priority under Japanese Patent Application No. 2020-199083, filed Nov. 30, 2020 and Japanese Patent Application No. 2021-159215, filed Sep. 29, 2021, and the entire contents of Japanese Patent Applications No. 2020-199083 and No. 2021-159215 are incorporated herein by reference.

REFERENCE SIGNS LIST

1 Electrode manufacturing device
2 Printing unit
2*a* Storage container
2*b* Printing device (a unit to provide a liquid composition for electrode)
10 Electrode
11 Electrode substrate
12 Isolation layer
20 Electrode device
30 Electrolyte
40 Outer case
100 Electrochemical device
111 Electrode substrate (current collector)
112 Electrode composite material layer
P Liquid composition for electrode

CITATION LIST

Patent Literature

[Patent Document 1] Japanese Patent Application Laid-Open No. 2000-277386

The invention claimed is:

1. A liquid composition for an electrode, comprising:
inorganic particles;
a resin; and
a dispersion medium,
wherein the resin is soluble in a non-polar solvent or in a mixed solvent containing a non-polar solvent, and the resin has an ethylene oxide chain in a main chain; and
wherein a solvent contained in the liquid composition does not include a protic polar solvent.

2. The liquid composition for an electrode according to claim 1, wherein the non-polar solvent is dimethyl carbonate.

3. The liquid composition for an electrode according to claim 1, wherein the non-polar solvent is ethyl methyl carbonate.

4. The liquid composition for an electrode according to claim 1, wherein the mixed solvent contains a polar solvent.

5. The liquid composition for an electrode according to claim 4, wherein the polar solvent is ethylene carbonate.

6. The liquid composition for an electrode according to claim 1, wherein the mixed solvent contains an electrolyte salt, and the mixed solvent can be used as an electrolytic solution.

7. The liquid composition for an electrode according to claim 6, wherein the electrolyte salt is a lithium salt.

8. The liquid composition for an electrode according to claim 1, wherein the resin contains a block copolymer having an ethylene oxide chain in the main chain.

9. The liquid composition for an electrode according to claim 1, wherein the resin contains a unit structure having a hydrophobic group and a unit structure having a hydrophilic group:
wherein the hydrophobic group is a propylene oxide chain and the hydrophilic group is an ethylene oxide chain.

10. The liquid composition for an electrode according to claim 9, wherein a total number of the hydrophilic groups is greater than a total number of the hydrophobic groups.

11. The liquid composition for an electrode according to claim 1, wherein the resin is a polyoxyethylene polyoxypropylene glycol.

12. The liquid composition for an electrode according to claim 1, wherein the inorganic particles contain an aluminum oxide.

13. The liquid composition for an electrode according to claim 1, wherein the resin contains a dispersant.

14. The liquid composition for an electrode according to claim 13, wherein the dispersant has a dispersible group and an adsorptive group; wherein the dispersible group is an oligoether group; and the adsorptive group is an ionic group having opposite polarity to the polarity to which the inorganic particles are charged, or the adsorptive group is a sulfonic acid group or a salt thereof, a carboxyl group or a salt thereof, or a primary, secondary, or tertiary amino group or a salt thereof.

15. A storage container, comprising the liquid composition for an electrode of claim 1.

16. An electrode manufacturing device, comprising:
the storage container of claim 15, and
a unit to provide the liquid composition for an electrode contained in the storage container.

17. The electrode manufacturing device of claim 16, wherein the unit to provide the liquid composition for the electrode discharges the liquid composition for the electrode in an ink-jet manner.

18. An electrode, comprising:
an electrode substrate;
an electrode composite material layer provided on the electrode substrate; and
an inorganic particle layer provided on the electrode composite material layer,
wherein the inorganic particle layer contains inorganic particles and a resin, and
wherein the resin is soluble in a non-polar solvent or in a mixed solvent containing a non-polar solvent, and the resin has an ethylene oxide chain in a main chain.

19. An electrochemical device, comprising the electrode of claim 13.

20. A liquid composition for an electrode, comprising:

inorganic particles;

a resin; and a dispersion medium, wherein the resin is soluble in a non-polar solvent or in a mixed solvent containing a non-polar solvent, and the resin has an ethylene oxide chain in a main chain; and wherein a solvent in the liquid composition comprises an aprotic polar solvent.

* * * * *